US008965816B2

(12) United States Patent
Okamoto

(10) Patent No.: US 8,965,816 B2
(45) Date of Patent: Feb. 24, 2015

(54) NON-TRANSITORY COMPUTER READABLE MEDIUM STORING A PROGRAM, SEARCH APPARATUS, SEARCH METHOD, AND CLUSTERING DEVICE

(71) Applicant: Fuji Xerox Co., Ltd., Tokyo (JP)

(72) Inventor: Hiroshi Okamoto, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 220 days.

(21) Appl. No.: 13/713,787

(22) Filed: Dec. 13, 2012

(65) Prior Publication Data
US 2013/0185235 A1 Jul. 18, 2013

(30) Foreign Application Priority Data

Jan. 18, 2012 (JP) ................................. 2012-008343
Oct. 25, 2012 (JP) ................................. 2012-235710

(51) Int. Cl.
G06N 5/00 (2006.01)
G06F 1/00 (2006.01)
G06N 99/00 (2010.01)

(52) U.S. Cl.
CPC .................................... G06N 99/005 (2013.01)
USPC .............................. 706/13; 704/246; 382/154

(58) Field of Classification Search
CPC ........... G06N 3/126; G06N 3/12; G06F 19/22
See application file for complete search history.

(56) References Cited

U.S. PATENT DOCUMENTS 5,590,242 A * 12/1996 Juang et al. .................... 704/245
5,598,507 A * 1/1997 Kimber et al. ................ 704/246

OTHER PUBLICATIONS

Page, L. et al., "The PageRank Citation Ranking: Bringing Order to the Web," Stanford Digital Library Technologies Project, pp. 1-17, Jan. 29, 1998.
Haveliwala, T. "Topic-Sensitive PageRank: A Context-Sensitive Ranking Algorithm for Web Search," IEEE Transactions on Knowledge and Data Engineering, pp. 1-22, Dec. 15, 2002.
Newman, M. E. J. et al., "Finding and evaluating community structure in networks," Physical Review E, vol. 69, No. 026113, pp. 1-15, Feb. 26, 2004.
Airoldi, E. M. et al., "Mixed Membership Stochastic Blockmodels," Journal of Machine Learning Research, vol. 9, No. 1981-2014, pp. 1-41, Sep. 2008.
Ball, B. et al., "Efficient and principled method for detecting communities in networks," Physical Review E, vol. 84, No. 036103, pp. 1-13, Sep. 8, 2011.
Van Dongen, S. "Graph clustering by flow simulation." PhD thesis, University of Utrecht, 2000, all pages.
Chung, F. et al., "Finding and Visualizing Graph Clusters Using PageRank Optimization," Proceedings of WAW, pp. 1-23, 2010.

* cited by examiner

Primary Examiner — Li-Wu Chang
Assistant Examiner — Kalpana Bharadwaj
(74) Attorney, Agent, or Firm — Oliff PLC

(57) ABSTRACT

Provided is a non-transitory computer readable medium storing a program causing a computer to function as a learning data acquiring unit that acquires learning data, a memory unit that performs machine learning using the learning data about cluster division where Markov chains of transition via a link from a node to a node on a network formed from plural nodes are divided into plural clusters each of which is indicated by a biased Markov chain and calculates a steady state of each biased Markov chain, a search condition receiving unit that receives a search condition from a user, a cluster extracting unit that extracts clusters suitable for the search condition, a partial network cutting unit that cuts a partial network formed by a node group belonging to the clusters, and an importance calculating unit that calculates importance of each node on the partial network.

6 Claims, 4 Drawing Sheets

NON-TRANSITORY COMPUTER READABLE MEDIUM STORING A PROGRAM, SEARCH APPARATUS, SEARCH METHOD, AND CLUSTERING DEVICE

CROSS-REFERENCE TO RELATED APPLICATIONS

This application is based on and claims priority under 35 USC 119 from Japanese Patent Application Nos. 2012-008343 filed Jan. 18, 2012 and 2012-235710 filed Oct. 25, 2012.

BACKGROUND

Technical Field

The present invention relates to a non-transitory computer readable medium storing a program, a search apparatus, a search method, and a clustering device.

SUMMARY

According to an aspect of the invention, there is provided a non-transitory computer readable medium storing a program causing a computer to function as:

a learning data acquiring unit that acquires learning data;

a memory unit that performs machine learning using the learning data about cluster division where Markov chains of transition via a link from a node to a node on a network formed from plural nodes and plural links connecting the plural nodes to each other are divided into plural clusters each of which is indicated by a biased Markov chain, and calculates a steady state of each biased Markov chain indicating each cluster of the learning result so as to obtain and store attribution degree information indicating an attribution degree of each node on the network to each cluster of the learning result;

a search condition receiving unit that receives a search condition from a user;

a cluster extracting unit that extracts clusters suitable for the search condition on the basis of a node group matching with the search condition received from the user and the attribution degree information;

a partial network cutting unit that cuts a partial network formed by a node group belonging to the clusters extracted by the cluster extracting unit from the network; and an importance calculating unit that calculates importance of each node on the partial network by executing an operation of a personalized PageRank algorithm having the node group matching with the search condition as a seed vector for the cut partial network, and generates a search result to the user regarding the search condition on the basis of the calculated importance.

BRIEF DESCRIPTION OF THE DRAWINGS

Exemplary embodiments of the present invention will be described in detail based on the following figures, wherein.

DETAILED DESCRIPTION

Basic Idea

Figure 1:
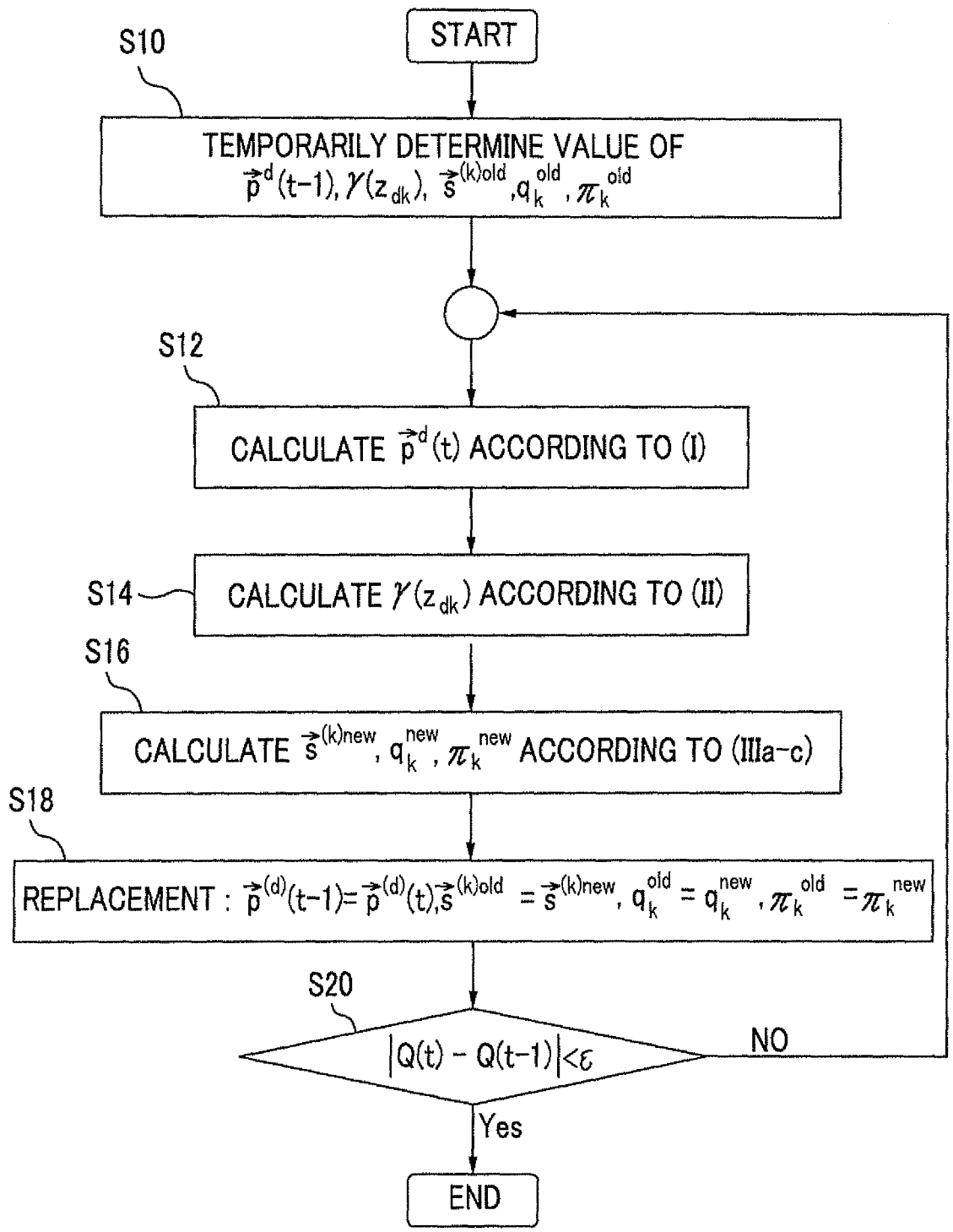
FIG. 1 is a flowchart illustrating an example of the procedure of a clustering process of Markov chains.

The reason why the PPR (Personalized PageRank) algorithm may not obtain the importance (page rank value) or ranking of a node in real time is that calculation of Markov chains is performed for the overall large-scale network which is targeted. It takes considerable time to perform such calculation for all the web pages (WWW: World Wide Web) on the Internet.

However, in order to obtain the node importance or ranking dependent on a user query (search request), it will be sufficient to perform Markov chain calculation only using portions related to the user query, not the overall original network. For example, in a case of obtaining node importance or ranking dependent on a query regarding drug development by performing Markov chain calculation, the scope of the Markov chains (the scope where an agent walks on the network) includes regions regarding medical science, pharmacy, biochemistry, and the like, but may not be required to include, for example, regions regarding aeronautical engineering, art, and archaeology.

Therefore, the "portions" related to the user query are appropriately cut from the network, the Markov chain calculation of the PPR algorithm is performed so as to be limited to the "portions", and thus the node importance or ranking dependent on the user query may be obtained in a shorter time than a case of performing calculation for the overall network.

Therefore, in the exemplary embodiment, Markov chains in the overall network are clustered, and a cluster related to a user query is extracted from plural clusters generated thereby. In addition, Markov chain calculation by the PPR algorithm is performed only for a partial network corresponding to the extracted cluster of the original network.

It is noted that clustering performed in the exemplary embodiment is not clustering of a static structure of nodes and links of the network but clustering of dynamic Markov chain processes where an agent randomly walks on links between nodes on the network.

The clustering in the exemplary embodiment is based on the following analogy regarding an agent walking on the network. That is to say, a Markov chain having no jump to a seed node set in a typical PageRank algorithm is modeled as the movement of an agent wandering about the overall network without particular intention. On the other hand, an agent who walks only in a particular direction on the network may be regarded as intending to search for a certain field or topic corresponding to the direction. This is referred to as an intentional Markov chain.

Therefore, in the exemplary embodiment, Markov chains in the overall network are structuralized in a form where plural intentional Markov chains are clustered on the basis of a theory of the machine learning. This clustering is performed in advance (that is, before a search responding to a user query online) using information for each user such as search history in the past of each user, or existing information based on the structure of the network or the like, such as information which is not dependent on a user. Although the clustering requires some time since calculation of Markov chains is performed for the overall network, it is performed before individual search (for example, once a week), and thus the time needed for it does not appear on a scene of an online search process.

In addition, in the exemplary embodiment, a calculation range when a user query is processed is restricted using such a prior clustering result. In other words, an attribution degree of a seed node set corresponding to the user query to each cluster is obtained, and one or more clusters related to the user query is selected according to the obtained attribution degree. Further, nodes belonging to one or more clusters selected are extracted from the original network as a partial network. By executing the PPR algorithm using the seed node set on the partial network, the node importance or ranking process dependent on the seed node set is calculated in a shorter time than a case of executing the PPR algorithm on the overall network.

Introduction: Formulation of PPR Algorithm Based on Bayesian Framework

Hereinafter, a probability distribution is attempted to estimate the following Expression 3 based on the Bayesian framework by introducing the following Expression 2 indicating a probability distribution of the following Expression 1.

$$\vec{p} = (p_1, \ldots, p_N)^T \quad \text{[Expression 1]}$$

$$P(\vec{p}) \quad \text{[Expression 2]}$$

$$\vec{p} \quad \text{[Expression 3]}$$

Here, N is the total number of nodes included in a target network. Hereinafter, in order to prevent confusion, the following Expression 4 is referred to as "active vector" p, and the term "probability" is used only with regard to the following Expression 5.

$$\vec{p} \quad \text{[Expression 4]}$$

$$P \quad \text{[Expression 5]}$$

Each component $p_n$ (where n is an integer of 1 to N) of the active vector p is the probability of an agent existing at a node with an identification number n (hereinafter, referred to as a "node n") on the network, which is referred to as "activity" of the node n. In other words, the active vector p indicates a distribution of probabilities (that is, "activities") of an agent being present at each node n on the network at a certain time.

Assuming that an agent follows links on the network and randomly walks with the passage of time, the active vector p progresses with the passage of time. It is assumed that stochastic dynamics of the active vector p satisfies the Markov property. In other words, a time series of the active vector p is expressed as follows.

$$\{\vec{p}(0), \ldots, \vec{p}(t)\} \quad \text{[Expression 6]}$$

The probability of the time series (probability that such a time series occurs) is expressed as follows.

$$P(\vec{p}(t), \ldots, \vec{p}(0)) = P(\vec{p}(0)) \Pi_{t'=1}^{t} P(\vec{p}(t') | \vec{p}(t'-1)) \quad \text{[Expression 7]}$$

Here, t and t' indicate discrete time points where 0 is a start point.

The stochastic dynamics will be described more in detail. The active vector p at the time point t, that is, the following Expression 8 is assumed to follow the Gaussian distribution having the following Expression 9 as a center.

$$\vec{p}(t) \quad \text{[Expression 8]}$$

$$T\vec{p}(t-1) \quad \text{[Expression 9]}$$

$$T = (T_{nm}) \quad \text{[Expression 10]}$$

Here, Expression 10 is a transition probability matrix of Markov chains (m is an integer of 1 to N) which satisfies the following Expression 11 and the following Expression 12.

$$T_{nm} \geq 0 \quad \text{[Expression 11]}$$

$$\Sigma_n T_{nm} = 1 \quad \text{[Expression 12]}$$

The transition probability matrix expresses the probability that an agent follows a link from the node m to the node n in the network and transitions as a matrix. For example, if an agent selects one or more links coming out of a node with the same probability, the transition probability matrix depends only on a structure of the network, that is, how nodes are linked to each other. In this case, the transition probability matrix is calculated from information of adjacent matrices indicating the structure of the network. In addition, the transition probability matrix is not necessarily limited thereto. Alternatively, as disclosed in Japanese Patent Application No. 2011-179512 by the present applicant, a transition probability matrix may be used in which a transition probability depends on not only the network structure but also the importance of a node of a link destination.

Under the above-described assumption following the Gaussian distribution (that is, assumption that transition between nodes does not follow a transition probability but errors according to the Gaussian distribution occur), the following relational expression is established.

[Expression 13]

$$P(\vec{p}(t) | \vec{p}(t-1)) = N(\vec{p}(t) | T\vec{p}(t-1), \alpha) \sim \exp\{-\frac{\alpha}{2}[\vec{p}(t) = T\vec{p}(t-1)]^T [\vec{p}(t) - T\vec{p}(t-1)]\} \quad (1.1)$$

"N( )" in Equation indicates the Gaussian distribution (normal distribution), and $\alpha$ indicates a variance of the distribution. The symbol "~" indicates that the left side and the right side (are the same except for the portion of the normalization constant).

The probability P indicated by this Equation is conditional as in Expression 14.

$$\vec{p}(t-1) \quad \text{[Expression 14]}$$

However, it may be regarded as a prior probability of the following Expression 15 in the meaning that information regarding evidence is not included.

$$\vec{p}(t) \quad \text{[Expression 15]}$$

In addition, at the limit where the variance $\alpha$ approaches infinity (in other words, the limit where a temperature $T\alpha = 1/\alpha$ approaches 0), a typical "deterministic" Markov chain is obtained as in the following Expression 16.

$$\vec{p}(t) = T\vec{p}(t-1) \quad \text{[Expression 16]}$$

Here, it is assumed that the active vector p at the time point t is observed in a deterioration state as in the following Expression 17 due to noise, that is, any uncertainty.

$$\vec{\tau} \quad \text{[Expression 17]}$$

If the deterioration is expressed as the Gaussian distribution, it is as follows.

[Expression 18]

$$P(\vec{\tau} | \vec{p}(t)) = N(\vec{\tau} | \vec{p}(t), \beta) \sim \exp\{-\frac{\beta}{2}[\vec{\tau} - \vec{p}(t)]^T [\vec{\tau} - \vec{p}(t)]\} \quad (1.2)$$

Here, β is a variance of the Gaussian distribution. This is a likelihood function of the active vector p at the time point t.

From the Bayesian formula, a posterior probability of the active vector p at the time point t is expressed by the following Equation.

[Expression 19]

$$P(\vec{p}(t)|\vec{p}(t-1),\vec{\tau}) \sim P(\vec{p}(t)|\vec{p}(t-1))P(\vec{\tau}|\vec{p}(t)) \quad (1.3)$$

In addition, by the use of Equations (1.1) and (1.2), the following Expression 20 is obtained.

$$P(\vec{p}(t)|\vec{p}(t-1))P(\vec{\tau}|\vec{p}(t)) \sim \quad \text{[Expression 20]}$$

$$\exp\left\{-\frac{\alpha}{2}[\vec{p}(t)-T\vec{p}(t-1)]^T[\vec{p}(t)-T\vec{p}(t-1)]\right\}$$

$$\exp\left\{-\frac{\beta}{2}[\vec{p}(t)-\vec{\tau}]^T[\vec{p}(t)-\vec{\tau}]\right\} =$$

$$\exp\left\{-\frac{\alpha}{2}[\vec{p}(t)-\vec{I}]^T[\vec{p}(t)-\vec{I}] - \frac{\beta}{2}[\vec{p}(t)-\vec{\tau}]^T[\vec{p}(t)-\vec{\tau}]\right\}(\vec{I}(t-1) \equiv T\vec{p}(t-1)) \ldots =$$

$$\exp\left\{-\frac{\alpha+\beta}{2}\left(\vec{p}(t)-\frac{\alpha}{\alpha+\beta}\vec{I}-\frac{\beta}{\alpha+\beta}\vec{\tau}\right)^T\right.$$

$$\left(\vec{p}(t)-\frac{\alpha}{\alpha+\beta}\vec{I}-\frac{\beta}{\alpha+\beta}\vec{\tau}\right) -$$

$$\left. \frac{\alpha\beta}{2(\alpha+\beta)}(\vec{I}^T-\vec{\tau}^T)(\vec{I}-\vec{\tau})\right\}$$

This Equation reproduces the well-known fact that Gaussian distribution×Gaussian distribution yields a Gaussian distribution.

The active vector p at the time point t is set by estimating MAP (Maximum a Posteriori).

$$\operatorname*{argmax}_{\vec{p}(t)} P(\vec{p}(t)|\vec{p}(t-1),\vec{\tau}): \vec{p}(t) - \quad \text{[Expression 21]}$$

$$\underbrace{\frac{\alpha}{\alpha+\beta}}_{1-r}T\vec{p}(t-1) - \underbrace{\frac{\beta}{\alpha+\beta}}_{r}\vec{\tau} = 0.$$

In this Expression, if β/(α+β) is replaced with r, and α/(α+β) is replaced with (1−r), the following Equation is obtained.

[Expression 22]

$$\therefore \vec{p}(t)-(1-r)T\vec{p}(t-1)-r\vec{\tau}=0 \quad (1.4)$$

Equation (1.4) is an equation of the PPR algorithm itself. Here, the active vector p at the time point (t−1), that is, the following Expression 23 is a "condition" of the conditional probability, and is required to be given in advance.

$$\vec{p}(t-1) \quad \text{[Expression 23]}$$

However, assuming a steady state, the following Expression 24 is established.

$$\vec{p}(t)=\vec{p}(t-1)=\vec{p}_s \quad \text{[Expression 24]}$$

Therefore, the following Expression 25 may be obtained by repeatedly calculating Equation (1.4).

$$\vec{p}_s = \lim_{t\to\infty} \vec{p}(t) \quad \text{[Expression 25]}$$

This calculation is the same as calculation of the PPR algorithm.

In the above description, the prior probability indicated by Equation (1.1) is interpreted to model "a random walker wandering about the network at random". According to the Bayesian formula, it is also possible to assume a "random walker searching the network with a sense of purpose", that is, intending to search for a certain region (related to, for example, medical science). A seed vector such as the following Expression 26 indicating a certain region (field) is prepared, and a prior probability is set using the following Expression 27.

$$\vec{s}=(s_1,\ldots,s_N)^T(\Sigma_{n=1}^{N}s_n=1) \quad \text{[Expression 26]}$$

[Expression 27]

$$P(\vec{p}(t)|\vec{p}(t-1)) \sim \exp$$

$$\left\{-\frac{\alpha}{2}[\vec{p}(t)-(1-q)T\vec{p}(t-1)-q\vec{s}]^T[\vec{p}(t)-(1-q)T\vec{p}(t-1)-q\vec{s}]\right\}.$$

In other words, it is assumed that a ratio q in an agent transitions to a state indicated by the seed vector, and the remaining ratio (1−q) transitions from a state at the previous time point (t−1) according to the transition matrix. At this time, an equation corresponding to Equation (1.4) becomes as follows.

$$\vec{p}(t)-(1-r)\{(1-q)T\vec{p}(t-1)+q\vec{s}\}-r\vec{\tau} =$$
$$\vec{p}(t)-(1-r)(1-q)T\vec{p}(t-1)-(1-r)q\vec{s}-r\vec{\tau}=0 \quad \text{[Equation 28]}$$

In addition, in a case where there are two or more intended regions, a Gaussian mixture is treated but may be treated in the same manner.

Clustering of Markov Chains

By introducing an orthodox method (latent variable method) of the machine learning to the above-described Bayesian formulation of the PPR algorithm, a description will be made of a case capable of deriving an algorithm for clustering Markov chains in the following.

The Markov chain clustering discussed here is defined as follows.

In other words, there is a network satisfying connectivity and Markov chains (following Equation) in the overall network are considered.

[Expression 29]

$$\vec{p}(t)=T\vec{p}(t-1) \quad (a)$$

Here, the respective clusters are defined as the following biased Markov chains.

[Expression 30]

$$\vec{p}(t)=(1-q_k)T\vec{p}(t-1)+q_k\vec{s}^{(k)}(0\leq q_k\leq 1, k=1,\ldots,K) \quad (b)$$

Here, the following Expression 31 shows an N-dimensional vector indicating a "core" of the k-th cluster.

$$\vec{s}^{(k)}=(s_1^{(k)},\ldots,s_N^{(k)})^T \quad \text{[Expression 31]}$$

$$0\leq s_n^{(k)}\leq 1, \Sigma_{n=1}^{N}s_n^{(k)}=1 \quad \text{[Expression 32]}$$

Here, k is an integer of 1 to K (where K is the total number of clusters). In addition, $q_k$ is a parameter indicating enlargement from the core (Expression 33) of the cluster k, and the closer to 0 (closer to 1) $q_k$, the greater (the smaller) the enlargement.

$$\vec{s}^{(k)} \quad \text{[Expression 33]}$$

It is assumed that, in relation to the Markov chains (a), observation data formed by D data points is given as follows.

$$\{\vec{\tau}^{(1)}, \ldots, \vec{\tau}^{(D)}\} \quad \text{[Expression 34]}$$

Here, the Expression 35 shows an N-dimensional vector indicating a data point d.

$$\vec{\tau}^{(d)} = (\tau_1^{(d)}, \ldots, \tau_N^{(d)})^T \quad \text{[Expression 35]}$$

$$0 \le \tau_n^{(d)} \le 1, \sum_{n=1}^{N} \tau_n^{(d)} = 1 \quad \text{[Expression 36]}$$

A core and enlargement of a cluster are estimated based on a framework described below from the observation data. In this way, the Markov chains (a) are clustered into plural biased Markov chains (b) indicating the respective clusters. In other words, cluster division suitable for the data points is obtained through machine learning using D data points included in the observation data.

However, as a method of preparing for observation data, that is, learning data (Expression 37), the following may be considered.

$$\{\vec{\tau}^{(1)}, \ldots, \vec{\tau}^{(D)}\} \quad \text{[Expression 37]}$$

(1) Observation data is obtained from search history of a user.

For example, D search results corresponding to D search queries from the user in the past (user query) are set as a seed vector (Expression 38) at each data point d forming the observation data.

$$\vec{\tau}^{(d)} \quad \text{[Expression 38]}$$

The seed vector may be obtained, for example, by considering an N-dimensional vector where values of nodes obtained as a result of search of a user query among N nodes on the network are set to a positive value (for example, "1") and values of the other nodes are set to "0" and by normalizing the vector such that the sum total of the components becomes 1 as follows.

$$\sum_{n=1}^{N} \tau_n^{(d)} = 1 \quad \text{[Expression 39]}$$

The "nodes obtained as a result of search" may be nodes (for example, nodes where fidelity to the search condition is equal to or more than a threshold value, nodes where fidelity to which a page rank value (or a PPR value) is added is equal to or more than a threshold value, a predefined number of nodes where fidelity is in a high rank, or the like) matching with a search condition indicated by the query, or may be nodes which are actually selected by a user from the node group matching with the search condition. If WWW is considered as the network, each web page is a node, a search condition (for example, a logical expression of keywords) which is transmitted to a search site by a user corresponds to a user query, a vector where web pages matching with the search condition or pages viewed by the user among the web pages are set to "1" and the other pages are set to "0", and the seed vector is obtained by normalizing the vector such that the sum total of components becomes 1. A group of D seed vectors is used as observation data for learning.

In addition, the "user" mentioned here may be an individual or a group formed by people. In any case, it is possible to obtain a cluster division result personalized for the "user" through machine learning of clustering on the network by the use of search history of the "user" in the past.

(2) A link state of each node on the network is used as observation data.

For example, an N-dimensional vector is considered in which, for each node, a component corresponding to a node of a link destination of links coming out of the node is set to a positive value (for example, "1") and components of the other nodes are set to "0", and a vector obtained by normalizing the N-dimensional vector such that the sum total of the components becomes 1 is used as a seed vector. In this case, the number D of data points is the same as the number N of nodes on the network.

(3) Observation data is generated through simulation of a random walk on the network.

For example, an N-dimensional vector is considered in which simulation of a random walk on the network is executed, components corresponding to L nodes at which an agent (random walker) drops in between continuous L steps (the agent moves from one node which is one step to another node) are set to a positive value (for example, "1"), and components corresponding to the other nodes are set to "0", and a vector obtained by normalizing the N-dimensional vector such that the sum total of the components becomes 1 is used as a seed vector. For example, a movement trajectory (node string) of the agent generated through the simulation may be cut into D seed vectors.

When observation data is prepared using the above-described method (1), clustering of the Markov chains is equivalent to saying that user queries are clustered. For example, by using observation data corresponding to a query group issued from a certain group (for example, a system such as a company), it is possible to obtain a clustering result which reflects what the group has interests in, and the like. In addition, when observation data is prepared using the method (2) or (3), it is possible to obtain what kind of combination of biased Markov chains Markov chains on the overall network are decomposed into.

Hereinafter, a description will be made of machine learning about clustering of Markov chains on the network using such observation data.

The following Gaussian distribution is considered.

[Expression 40]

$$N(\vec{p}(t) \mid \vec{l}^{(k)}(t-1), \alpha) = \quad (2.1)$$

$$\left(\frac{\alpha}{2\pi}\right)^{N/2} \exp\left\{-\frac{\alpha}{2}[\vec{p}(t) - \vec{l}^{(k)}(\vec{p}(t-1))]^T [\vec{p}(t) - \vec{l}^{(k)}(\vec{p}(t-1))]\right\}$$

Here, the following is given.

$$\vec{l}^{(k)}(\vec{p}(t-1)) = (1-q_k)T\vec{p}(t-1) + q_k \vec{s}^{(k)} = T\vec{p}(t-1) + q_k(\vec{s}^{(k)} - T\vec{p}(t-1)) \quad \text{[Expression 41]}$$

Here, a latent variable is defined as follows.

$$\vec{z} \quad \text{[Expression 42]}$$

$$z_k \in \{0,1\} \quad \text{[Expression 43]}$$

and $$\sum_{k=1}^{K} z_k = 1 \quad (2.2a)$$

Here, $z_k$ is a k-th component of the latent variable (where k is an integer of 1 to K). In addition, $z_k = 1$ indicates that a cluster k is selected. The latent variable has components of the same number as the total number of clusters (in other words, biased Markov chains) to be obtained through the clustering. Equation (2.2a) indicates that any one of K components of the latent variable is "1" and the others are "0".

Here, a probability that the component $z_k$ is "1" is set as $\pi_k$.

[Expression 44]

$$P(z_k=1)=\pi_k \qquad (2.2b)$$

Here, $$0 \leq \pi_k \leq 1$$

and $$\Sigma_{k=1}^{K}\pi_k=1$$

This probability is the probability that the cluster k is selected.

[Expression 45]

$$P(\vec{z})=\Pi_{k=1}^{K}\pi_k^{z_k} \qquad (2.3)$$

[Expression 46]

$$P(\vec{p}(t)|z_k=1)=N(\vec{p}(t)|\vec{I}^{(k)}(\vec{p}(t-1)),\alpha). \qquad (2.4)$$

$$P(\vec{p}(t)|\vec{z})=\Pi_{k=1}^{K}N(\vec{p}(t)|\vec{I}^{(k)}(\vec{p}(t-1)),\alpha)^{z_k}. \qquad (2.5)$$

The following Equation is derived from the product rule of probability.

[Expression 47]

$$P(\vec{\tau},\vec{p}(t)|\vec{z})=N(\vec{\tau}|\vec{p}(t),\beta)\Pi_{k=1}^{K}N(\vec{p}(t)|\vec{I}^{(k)}(\vec{p}(t-1)),\alpha)^{z_k}. \qquad (2.6)$$

Here, the vector τ is a component (seed vector) of the above-described observation data. Therefore, likelihood to be maximized is expressed as follows.

[Expression 48]

$$P(\vec{\tau},\vec{p}(t))=\Sigma_{\vec{z}}P(\vec{z})P(\vec{\tau},\vec{p}(t)|\vec{z})=N(\vec{\tau}|\vec{p}(t),\beta)\Sigma_{k=1}^{K}\pi_k N(\vec{p}(t)|\vec{I}^{(k)}(\vec{p}(t-1)),\alpha) \qquad (2.7)$$

By taking logarithm of the leftmost side and the rightmost side of Equation (2.7), the following Equation is derived.

[Expression 49]

$$\ln P(\vec{\tau},\vec{p}(t))=\ln N(\vec{\tau}|\vec{p}(t),\beta)+\ln \Sigma_{k=1}^{K}\pi_k N(\vec{p}(t)|\vec{I}^{(k)}(\vec{p}(t-1)),\alpha). \qquad (2.8)$$

In an example described below, an EM (Expectation and Maximization) algorithm is used as an algorithm for the machine learning. However, the EM algorithm is only an example which may be employed, and other methods such as a k-means method may be used.

In the EM algorithm, first, in an E step, an attribution degree $\gamma(z_k)$ to the cluster k defined by the following Equation is calculated.

[Expression 50]

$$\gamma(z_k) \equiv p(z_k=1 \mid \vec{\tau}, \vec{p}(t)) \qquad (2.9)$$
$$= \frac{\pi_k N(\vec{p}(t) \mid \vec{I}^{(k)}(\vec{p}(t-1)), \alpha)}{\sum_{i=1}^{K} \pi_i N(\vec{p}(t) \mid \vec{I}^{(i)}(\vec{p}(t-1)), \alpha)}.$$

The leftmost side is derived by applying the Bayesian theorem to the middle term of Equation (2.9). In addition, here, the following is given.

$$\Sigma_{k=1}^{K}\gamma(z_k)=1. \qquad \text{[Expression 51]}$$

The subsequent M step will be described.

$\vec{p}(t)$ [Expression 52]

A result obtained by differentiating Equation (2.8) with respect to Expression 52 is set to 0 (differential of Equation (2.8) at the maximum value of the posterior probability is 0), and thereby the following Equation may be obtained.

[Expression 53]

$$\vec{p}(t) = \frac{\beta}{\alpha+\beta}\tau + \frac{\alpha}{\alpha+\beta}\sum_{k=1}^{K}\gamma(z_k)\vec{I}^{(k)}(\vec{p}(t-1)) \qquad (2.10)$$

Here, the following is given.

$$\vec{I}^{(k)}(\vec{p}(t-1))=(1-q_k)T\vec{p}(t-1)+q_k \vec{s}^{(k)}=T\vec{p}(t-1)+q_k(\vec{s}^{(k)}-T\vec{p}(t-1)) \qquad \text{[Expression 54]}$$

Equation (2.10) is derived as follows.

[Expression 55]

$$0 = -\beta(\vec{p}(t)-\vec{\tau}) - \frac{\sum_{k=1}^{K}\pi_k N(\vec{p}(t) \mid \vec{I}^{(k)}(\vec{p}(t-1)), \alpha)\alpha(\vec{p}(t)-\vec{I}^{(k)}(\vec{p}(t-1)))}{\sum_{k=1}^{K}\pi_k N(\vec{p}(t) \mid \vec{I}^{(k)}(\vec{p}(t-1)), \alpha)}$$

$$= -\beta(\vec{p}(t)-\vec{\tau}) - \alpha\sum_{k=1}^{K}\gamma(z_k)\left(\vec{p}(t)-\vec{I}^{(k)}(\vec{p}(t-1))\right)$$

$$= -\beta\vec{p}(t) - \underbrace{\left[\sum_{k=1}^{K}\gamma(z_k)\right]}_{=1}\vec{p}(t) + \beta\vec{\tau} + \alpha\sum_{k=1}^{K}\gamma(z_k)\vec{I}^{(k)}(\vec{p}(t-1))$$

$$= -(\alpha+\beta)\vec{p}(t) + \beta\vec{\tau} + \alpha\sum_{k=1}^{K}\gamma(z_k)\vec{I}^{(k)}(\vec{p}(t-1)).$$

In other words, Equation (2.10) is derived by performing calculation such that the differential of Equation (2.8) is obtained and is set to 0. Equation (2.10) indicates Markov chains.

Here, it is assumed that observation data (learning data) having D data points is given as follows.

$$\{\vec{\tau}^{(1)}, \ldots, \vec{\tau}^{(D)}\} \qquad \text{[Expression 56]}$$

In addition, a result obtained through summation of the logarithmic probability indicated by Equation (2.8) over the D data points is introduced as an evaluation value Q. That is to say, the evaluation value Q is expressed by the following Equation.

[Expression 57]

$$\Sigma_{d=1}^{D} \ln P(\vec{\tau}^{(d)}, \vec{p}^{(d)}(t)) = \Sigma_{d=1}^{D} \ln N(\vec{\tau}^{(d)} | \vec{p}^{(d)}(t), \beta) + \Sigma_{d=1}^{D} \ln \Sigma_{k=1}^{K} \pi_k N(\vec{p}^{(d)}(t) | \vec{I}^{(k)}(\vec{p}^{(d)}(t-1)), \alpha) = Q \quad (2.11)$$

[Expression 58]

$$\vec{s}_k(t)$$

A result obtained by differentiating the leftmost side and the middle of Equation (2.11) with respect to Expression 58 is set to 0, and thereby the following Equation (2.12) is derived.

[Expression 59]

$$\vec{s}^{(k)} = \frac{\sum_{d=1}^{D} \gamma(z_{dk}) \left[ \vec{p}^{(d)}(t) - (1 - q_k) T \vec{p}^{(d)}(t-1) \right]}{q_k D_k} \quad (2.12)$$

Here, $$\gamma(z_{dk}) = p\left(z_{dk} = 1 \mid \vec{\tau}^{(d)}, \vec{p}^{(d)}(t)\right) \quad (2.13)$$

$$= \frac{\pi_k N\left(\vec{p}^{(d)}(t) \mid \vec{I}^{(k)}\left(\vec{p}^{(d)}(t-1)\right), \alpha\right)}{\sum_{l=1}^{K} \pi_l N\left(\vec{p}^{(d)}(t) \mid \vec{I}^{(l)}\left(\vec{p}^{(d)}(t-1)\right), \alpha\right)}$$

and $$D_k = \Sigma_{d=1}^{D} \gamma(z_{dk}) \quad (2.14)$$

Further, the differential regarding $q_k$ of Equation (2.11) is set to 0, and thereby the following Equation (2.15) is derived.

[Expression 60]

$$q_k = \frac{\sum_{d=1}^{D} \gamma(z_{dk}) \begin{bmatrix} \left(\vec{p}^{(d)}(t) - T\vec{p}^{(d)}(t-1)\right)^T \left(\vec{s}^{(k)} - T\vec{p}^{(d)}(t-1)\right) + \\ \left(\vec{s}^{(k)} - T\vec{p}^{(d)}(t-1)\right)^T \left(\vec{p}^{(d)}(t) - T\vec{p}^{(d)}(t-1)\right) \end{bmatrix}}{2 \sum_{d=1}^{D} \gamma(z_{dk}) \left(\vec{s}^{(k)} - T\vec{p}^{(d)}(t-1)\right)^T \left(\vec{s}^{(k)} - T\vec{p}^{(d)}(t-1)\right)} \quad (2.15)$$

In addition, the following Equation (2.16) is obtained by adding the same term to the leftmost side and the middle term of Equation (2.11).

[Expression 61]

$$\Sigma_d \ln P(\vec{\tau}^{(d)}, \vec{p}^{(d)}(t)) = \lambda(\Sigma_{k=1}^{K} \pi_k - 1)$$

$$= \Sigma_d \ln N(\vec{\tau}^{(d)} | \vec{p}^{(d)}(t), \beta) + \Sigma_d \ln \Sigma_{k=1}^{K} \pi_k N(\vec{p}^{(d)}(t) | \vec{I}^{(k)}(\vec{p}^{(d)}(t-1)), \alpha) + \lambda(\Sigma_{k=1}^{K} \pi_k - 1) \quad (2.16)$$

Both sides of Equation (2.16) are differentiated with respect to $\pi_k$, a value of the differential result is set to 0, and thereby the following Equation (2.17) is derived.

[Expression 62]

$$\pi_k = \frac{D_k}{D} \quad (2.17)$$

The above-described deriving is made by applying an orthodox EM algorithm applying method disclosed in Chapter 9 of "Pattern Recognition And Machine Learning (Information Science and Statistics) written by Christopher M. Bishop" (published by Springer, 2006 Aug. 17), to the clustering of Markov chains on the network.

Flow of Clustering Process: Offline Process

To summarize the above description, the flow of the clustering process in the exemplary embodiment is a flow as shown in FIG. 1. That is to say, it is assumed that observation data (learning data) formed by D data points is given as follows.

$$\{\vec{\tau}^{(1)}, \ldots, \vec{\tau}^{(D)}\}: \quad \text{[Expression 63]}$$

In the exemplary embodiment, Markov chains regarding the data point d is indicated by the following Equation (I) (derived from the above-described Equation (2.10)).

[Expression 64]

$$\vec{p}^{(d)}(t) = \frac{\beta}{\alpha + \beta} \tau^{(d)old} + \frac{\alpha}{\alpha + \beta} \sum_{k+1}^{K} \gamma(z_{dk}) \vec{I}^{(k)}\left(\vec{p}^{(d)}(t-1)\right) \quad (I)$$

Here, $$\vec{I}^{(k)}(\vec{p}(t-1)) = (1 - q_k^{old}) T\vec{p}(t-1) + q_k \vec{s}^{(k)old} =$$
$$T\vec{p}(t-1) + q_k^{old}(\vec{s}^{(k)old} - T\vec{p}(t-1)).$$

In other words, Equation (I) indicates that, in the probability of an agent existing at each node on the network, a certain ratio $\beta/(\alpha+\beta)$ depends on the seed vector $\tau^{(d)old}$ of the data point d (that is, the ratio $\beta/(\alpha+\beta)$ indicates that the agent returns to a node group indicated by the seed vector), and the other is obtained by adding probabilities obtained by Markov chains of the cluster k to each other according to an attribution degree to the cluster k.

In the clustering process, first, as shown in step S10 of FIG. 1, values of the variables included in the respective terms of the right side of Equation (I) is temporarily determined. In addition, the transition probability matrix T is assumed to be obtained in advance based on a link structure of the network, for example, in the same method as in the case of the PageRank algorithm. Further, $\alpha$ and $\beta$ are variances of the Gaussian distribution shown in Equation (1.1) and Equation (1.2), and these values are designated by a user.

After the variables are temporarily determined as such (S10), Equation (I) is calculated (S12).

Next, in the E step of the EM algorithm, the attribution degree $\gamma(z_{dk})$ is calculated using the following Equation (II) (S14).

[Expression 65]

$$\gamma(z_{dk}) = \frac{\pi_k^{old} N\left(\vec{p}^{(d)}(t) \mid \vec{I}^{(k)}\left(\vec{p}^{(d)}(t-1)\right), \alpha\right)}{\sum_{i=1}^{K} \pi_i^{old} N\left(\vec{p}^{(d)}(t) \mid \vec{I}^{(l)}\left(\vec{p}^{(d)}(t-1)\right), \alpha\right)}. \quad \text{(II)}$$

Next, in the M step, the respective values indicated by the following Equations (IIIa) to (IIIc) are calculated (S16).

[Expression 66]

$$\vec{s}^{(k)new} = \frac{\sum_{d=1}^{D} \gamma(z_{dk})\left[\vec{p}^{(d)}(t) - (1-q_k^{old})T\vec{p}^{(d)}(t-1)\right]}{q_k^{old} D_k} \quad \text{(IIIa)}$$

$$q_s^{new} = \frac{\sum_{d=1}^{D} \gamma(z_{dk})\left[\left(\vec{p}^{(d)}(t) - T\vec{p}^{(d)}(t-1)\right)^T\left(\vec{s}^{(k)old} - T\vec{p}^{(d)}(t-1)\right) + \left(\vec{s}^{(k)old} - T\vec{p}^{(d)}(t-1)\right)^T\left(\vec{p}^{(d)}(t) - T\vec{p}^{(d)}(t-1)\right)\right]}{2\sum_{d=1}^{D} \gamma(z_{dk})\left(\vec{s}^{(k)old} - T\vec{p}^{(d)}(t-1)\right)^T\left(\vec{s}^{(k)old} - T\vec{p}^{(d)}(t-1)\right)} \quad \text{(IIIb)}$$

$$\pi_k^{new} = \frac{D_k}{D} \quad \text{(IIIc)}$$

Here, $$D_k = \sum_{d=1}^{D} \gamma(z_{dk})$$

In addition, in order to perform the subsequent iterative operations, the values of the respective variables obtained using Equations (I) to (IIIc) are set as variables (a probability and variables with the subscript old at the time point t−1) indicating values before one step (S18).

In addition, the time point t progresses by one until an evaluation value Q defined by the following Equation (IV) becomes sufficiently smaller than all the data points d (that is, it becomes smaller than a predefined threshold value $\epsilon$), and the processes in steps S12 to S18 are repeatedly performed (S20).

[Expression 67]

$$Q = \Sigma_{d=1}^{D} \ln N(\vec{\tau}^{(d)} \mid \vec{p}^{(d)}(t), \beta) + \Sigma_{d=1}^{D} \ln \Sigma_{k=1}^{K} \pi_k$$
$$N(\vec{p}^{(d)}(t) \mid \vec{I}^{(k)}(\vec{p}^{(d)}(t-1)), \alpha) < \epsilon. \quad \text{(IV)}$$

Calculation results of Equations (IIIa) and (IIIb) when the evaluation value Q is smaller than the threshold value $\epsilon$ are a core (Expression 68) and an enlargement $q_k$ of each cluster k obtained from the observation data (learning data).

[Expression 68]

$$\vec{s}^{(k)} = (s_1^{(k)}, \ldots, s_N^{(k)})^T$$

Each cluster k is regulated by the core and the enlargement.

In the exemplary embodiment, the node group on the network is clustered using the above-described clustering result of the Markov chains. In other words, it is determined to which cluster of the clustering result of the Markov chains each node belongs. A cluster to which each node is attributed is not necessarily limited to a single cluster, and, for example, a single node may be understood to be attributed to plural clusters with an individual degree of attribution.

In the clustering process of the nodes, a steady state of the Markov chains defined by the following Equation is obtained by the use of the core and the enlargement of each cluster defined through the procedures described hitherto (that is, the personalized PageRank algorithm is executed).

[Expression 69]

$$(\vec{p}(t) = (1-q_k)T\vec{p}(t-1) + q_k \vec{s}^{(k)}. \quad \text{(V)}$$

Equation (V) is the same as Equation (b) (Expression 30) described above, and is an equation of biased Markov chains indicating the cluster k which is a clustering result of the Markov chains.

A method of obtaining the steady state follows a typical Markov chain calculation method.

$\vec{p}(t)$ [Expression 70]

That is to say, the time point t progresses by one and calculation of Equation (V) is repeatedly performed until Expression 70 converges.

The cluster k is regulated by the steady state (Expression 71) obtained in this way (the subscript indicates a steady state).

[Expression 71]

$$\vec{p}^{[s,k]}(p_1^{[s,k]}, \ldots, p_N^{[s,k]}) \quad \text{(VI)}$$

$p_n^{[s,k]}$ [Expression 72]

Here, Expression 72 indicates an "attribution degree of a node n to the cluster k". That is to say, the greater (closer to 1) this value, the higher the possibility that the node n may be attributed (that is, belong) to the cluster k, and the smaller (that is, closer to 0) this value, the lower the possibility that the node n may be attributed to the cluster k. As such, the attribution degree vector $p^{[s,k]}$ shown in Equation (VI) indicates a distribution of degrees that each node on the network is attributed to the cluster k according to the node number n.

In this way, a vector formed from the attribution degree of each node n to the cluster k indicated by Equation (VI) is obtained as a result of the clustering. The clustering result is used for an online search process described later.

The clustering process of Markov chains described above requires considerable time for calculation since it is necessary to perform the PPR algorithm for all the nodes on the network. However, contents of user queries are variously changed for each search, but change in a cluster division state of Markov chains based on search history or the like of a user (there is case of a group) in the past is quite smooth temporally. Therefore, since a search result (ranking result) with sufficient accuracy for user queries may be obtained even if a clustering result once obtained is used for a long time to some degree, the clustering process may not be performed each time for each user query. Therefore, in the exemplary embodiment, the clustering process is performed as an offline process at a predefined timing, for example, once a week or once a day, separately from an online process of responding to a user query in real time. That is to say, for example, periodically, for each user, clustering is periodically learned according to the above-described methods using observation data for learning generated from search history or the like of the user. Through this learning, a vector indicating features of each cluster k indicated by Equation (VI) is obtained. The obtained vector is reserved in correlation with an ID (identification information) of the user and is referred to when an online search process is performed.

Search Using Clustering Result: Online Process

Next, a description will be made of an example of the search process (online process) for a user query in real time using the above-described clustering result of Markov chains with reference to FIG. 2.

Figure 2:
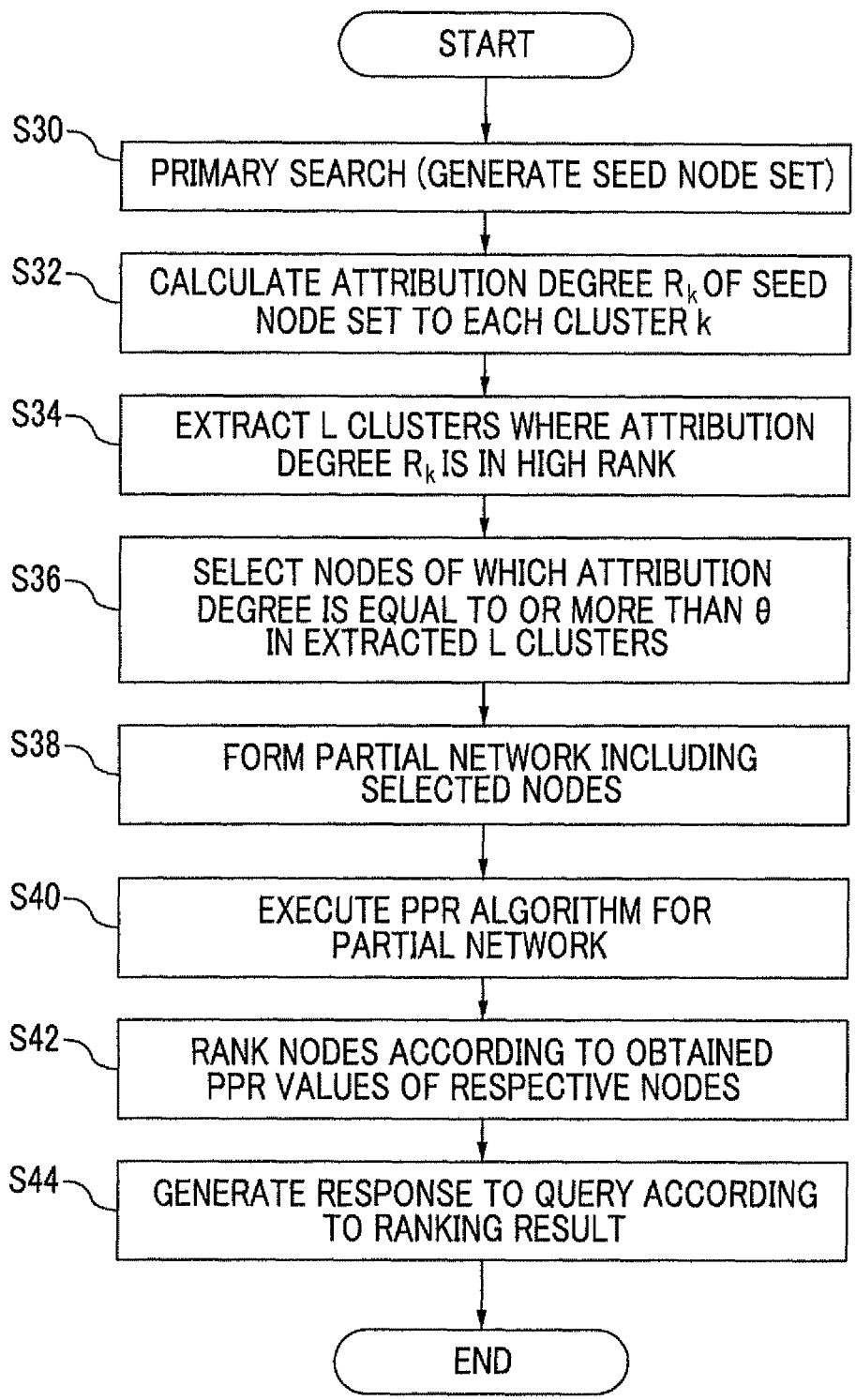
FIG. 2 is a flowchart illustrating an example of the procedure of a search process using the clustering result.

The procedures of FIG. 2 are executed using coming of a search query from a user (user query) as a trigger. In addition, it is assumed that the user completes logging in a search system, and, as a result, the search system knows an ID of the user issuing the query.

In this procedure, first, the search system searches the network (for example, WWW) for nodes (for example, web pages) matching with a search condition (for example, a logical expression or the like formed from one or more keywords) included in the user query (S30: primary search). In the primary search, without taking into consideration importance of each node based on a page rank or the like, simply, nodes (that is, nodes where fidelity to the search condition is equal to or more than a threshold value or a predefined number of nodes where fidelity is in a high rank) matching with the search condition is obtained. The fidelity to the search condition may be obtained using a search technique in the related art. From a result of the primary search, a seed node set corresponding to the user query is generated as follows.

$$\vec{\tau}$$ [Expression 73]

This seed node set is an N-dimensional vector where components corresponding to the obtained nodes which coincide with the search condition of the user query among N nodes on the network are set to a positive value (for example, "1") and components corresponding to the other nodes are set to "0". The seed node set expresses features of the user query as a distribution (a distribution indicating which node coincides with the search condition) of the nodes matching with the search condition in the network.

In addition, the search system acquires information regarding a clustering result corresponding to the user issuing this user query among reserved information regarding a clustering result of each user. In addition, in a case where a reserved clustering result corresponds to a user group including plural individuals, to which group a user who logs in belongs may be obtained from a directory database or the like, and information regarding a clustering result corresponding to the obtained group may be acquired.

$$R_k(\vec{\tau})$$ [Expression 74]

Next, the search system calculates the attribution degree (Expression 74) of the seed node set to the cluster k according to the following Equation (S32).

[Expression 75]

$$R_k(\vec{\tau}) = \Sigma_{n=1}^{N} \tau_n p_n^{[s,k]}. \quad (A1)$$

The attribution degree $p_n^{[s,k]}$ of the node n to the cluster k used for calculation of Equation (A1) is included in information regarding the clustering result corresponding to the user who is a query issuing source. The right side of Equation (A1) is an operation for obtaining an inner product of the vector $\tau$ (that is, the seed node set) and the vector $p^{[s,k]}$, (that is, the vector having an attribution degree of each node to the clusters on the network as a component). The higher the commonality between a node group indicating the features of the user query indicated by the seed node set and a node group having a high attribution (affiliation) degree to the cluster k indicated by the vector $p^{[s,k]}$, the greater the attribution degree $R_k$.

$$R_k(\vec{\tau})$$ [Expression 76]

Next, the search system extracts L clusters in order from clusters of which a value of an attribution degree (Expression 76) obtained through the operation of Equation (A1) is great (S34). Here, L is a value indicating the number of extracted clusters, and is set in advance, $$p_n^{[s,k]} \geq \theta$$ [Expression 77]

In addition, the search system selects nodes satisfying Expression 77 (a value of 0 is set in advance) from each of the extracted L clusters (S36). Here, k is an identification number of the extracted L clusters. That is to say, in step S36, the attribution degree $p_n^{[s,k]}$ to the cluster k is an analog value having 0 to 1, and a node n of which this value is equal to or more than the threshold value $\theta$ is selected as a node which belongs to the cluster k. As such, the value of the threshold value $\theta$ regulates a lower limit value of an attribution degree determined as a node belonging to the cluster k.

In this way, a network is formed from a node group selected from the L clusters and links between the nodes on the original network (S38). This network is a partial network of the original network. That is to say, in step S38, a partial network formed from only nodes of the extracted clusters is cut from the original network.

An adjacent matrix defining a structure of the partial network is indicated by the following Expression.

$$\tilde{A}(\vec{\tau}) = (\tilde{A}_{ij}(\vec{\tau}))$$ [Expression 78]

Here, i and j are 1, 2, ..., $N^{(t)}$, and $N^{(t)}$ is the total number ($N^{(t)} < N$) of nodes forming the partial network.

In this procedure, next, a steady state of Markov chains defined by the following Equation is obtained (S40). That is to say, the PPR algorithm is executed.

[Expression 79]

$$\vec{p}(t) = \frac{\beta}{\alpha + \beta} \vec{\tau} + \frac{\alpha}{\alpha + \beta} \tilde{T}^{(\tau)} \vec{p}(t-1). \quad (A2)$$

$$\tilde{T}(\vec{\tau}) = (\tilde{T}_{ij}(\vec{\tau})) = (\tilde{A}_{ij}(\vec{\tau})/\Sigma_{i=1}^{N} \tilde{A}_{ij}(\vec{\tau}))$$ [Expression 80]

Here, Expression 80 indicates a transition probability matrix. In addition, the transition probability matrix exemplified here is a matrix where all the links on the network are regarded as having the same value (that is, a matrix where an agent existing at a certain node is regarded as selecting plural links coming out of the node with the same probability), and is used in a typical PageRank algorithm. The transition probability matrix is regulated only by a link structure of the network and is a static matrix which does not vary with dynamics (passage of time) of the Markov chains.

However, this is only an example. Alternatively, for example, a transition probability matrix may be set such that the higher the evaluation value (importance) of a previous node of a link, the higher the probability (transition probability) that the link is selected. In this case, if an evaluation value of each node varies with the dynamics of the Markov chains, the transition probability matrix also varies. As such, a steady solution may be obtained by repeatedly performing calculation of Equation (A2) of Markov chains while updating the transition probability matrix temporally. In addition, a method of setting a transition probability according to an evaluation value of a link destination node is described in detail in Japanese Patent Application No. 2011-179512 filed by the present applicant, and thus further description thereof will be omitted.

$$\vec{p}$$ [Expression 81]

$$\vec{p}$$ [Expression 82]

Expression 81 in Equation (A2) is an $N^{(t)}$-dimensional vector, and is formed by extracting only components corresponding to $N^{(t)}$ nodes of the partial network from the N-dimensional vector (Expression 82).

$$\vec{\tau}$$ [Expression 83]

$$\vec{\tau}$$ [Expression 84]

The $N^{(t)}$-dimensional vector (Expression 83) is also formed from the N-dimensional vector (Expression 84) in the same manner.

$$\vec{p}^{(s)} = (\tilde{p}_1^{(s)}, \ldots \tilde{p}_{N(\tau)}^{(s)})$$ [Expression 85]

Importance of each of N(t) nodes on the partial network is set using a page rank value (Expression 85) of the steady state obtained by the PPR algorithm of Equation (A2).

$$\tilde{p}_i^{(s)}$$ [Expression 86]

That is to say, Expression 86 indicates importance of a node i. The $N^{(t)}$ nodes are ranked depending on the size of the importance set in this way (S42). In addition, an evaluation value to which both the calculated importance of a node and the fidelity of the node to the user query (search condition) are added may be obtained, and each node may be ranked in higher order in the evaluation value. In addition, response information to the user query is generated according to the ranking result, and the response information returns to the user issuing the query (S44). The response information is, for example, a list of nodes arranged in ranking order (for example, a list where links to a web page are arranged in ranking order).

Through the above-described procedures, the response information to the user query is obtained in consideration of a PPR value. Although, in this search process, calculation of the PPR algorithm shown in Equation (A2) is performed, a target of the calculation is not the overall network but a partial network formed only by clusters having a high attribution degree (similarity) to the seed node set. For this reason, costs needed for the calculation are much smaller than in the case of the typical PPR algorithm operation targeting the overall network. Therefore, a search result is obtained in substantially real time for a user query.

Although, in the above example, the seed node set τ is obtained through the primary search, this is only an example, the seed node set may be obtained using other methods.

Example of System Configuration

Figure 3:
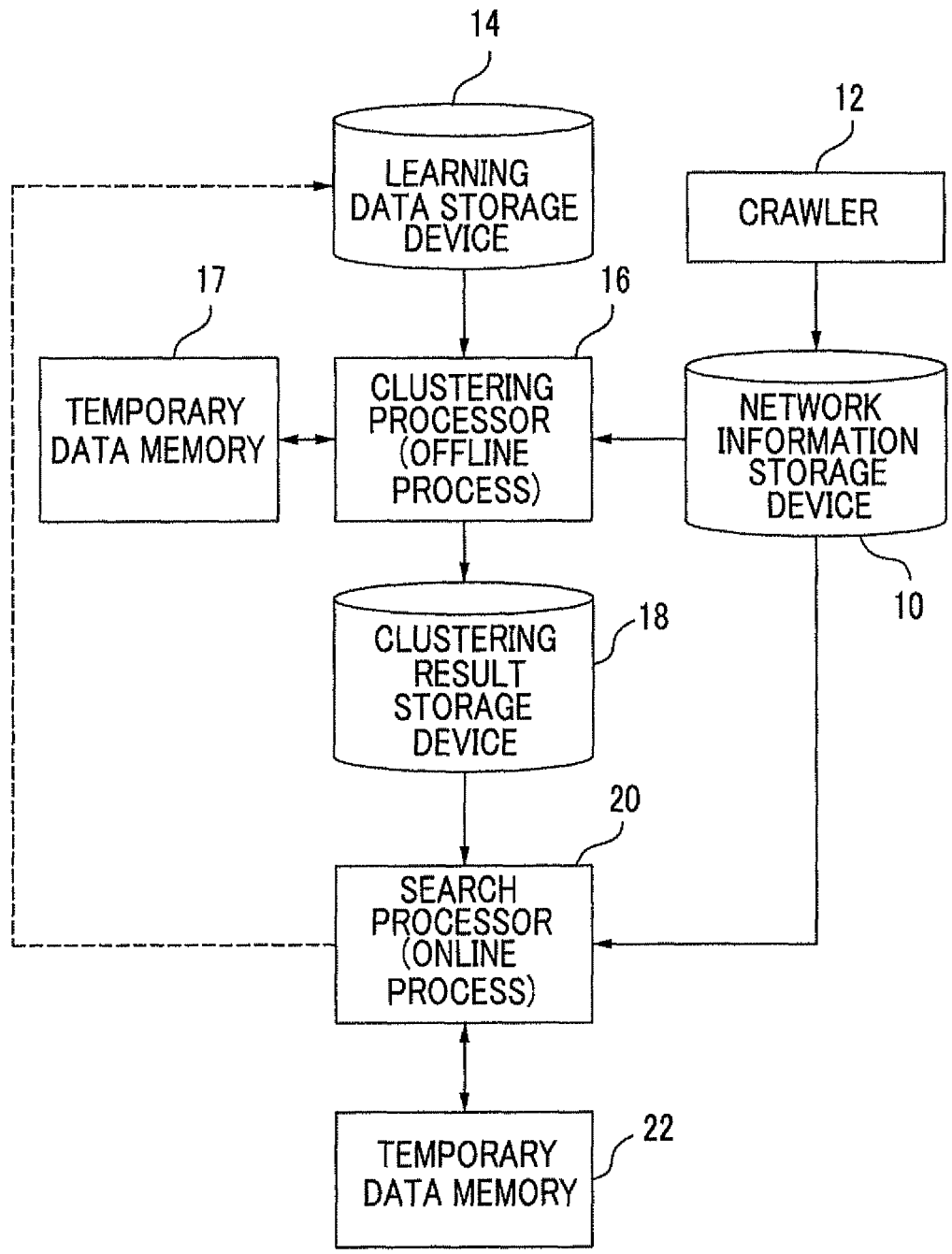
FIG. 3 is a diagram illustrating a configuration of the search system according to an exemplary embodiment of the present invention.

FIG. 3 shows an example of the configuration of the search system which executes the above-described offline (clustering) process and online (search) process.

In FIG. 3, a network information storage device 10 is a storage device storing information (hereinafter, referred to as "network information") regarding a network (for example, WWW) to be processed. The network information includes information indicating a structure of the network, that is, information indicating a link connection relationship between nodes in the network. The network structure information is expressed, for example, in a form of an adjacent matrix. As is well known, an adjacent matrix $A_{nm}$, is a matrix where, if a link is stretched from a node m to a node n, $A_{nm}=1$, and, otherwise, $A_{nm}=0$. In addition, the network information may include detailed information regarding each node. For example, if a node is a web page, text information in the web page is an example of the detailed information. In a case of targeting a network where the structure of the network or contents of each node may vary with the passage of time such as WWW, a crawler 12 periodically circulates the network, and updates the network information in the network information storage device 10 according to the circulation result.

A learning data storage device 14 is a device which stores learning data (the above-described "observation data τ") used for learning cluster division of Markov chain processes on the network. If search according to a concern of each user is to be realized, the learning data storage device 14 stores learning data for each user. As the learning data for each user, for example, search history of each user exemplified above may be used. In this case, for example, a search result of a search processor 20 described later may be stored in the learning data storage device 14. The learning data storage device 14 may store information regarding search results corresponding to the number D of data points used for learning for each user, and, for example, each time a user makes a new search, the oldest of the D search results may be deleted from the learning data storage device 14, and the search result in this time may be added.

A clustering processor 16 learns the clustering of Markov chains on the network by executing the above-described process procedures of FIG. 1 by the use of the network structure information stored in the network information storage device 10 and the learning data stored in the learning data storage device 14. This learning process is executed each time update timing of the clustering comes. When a process of responding to a user query in real time is called an online process, this learning process may be called an offline process.

Here, the clustering processor 16 reads values of variables such as cores or enlargements of the cluster from a temporary data memory 17, performs the calculation in steps S12, S14 and S16 in FIG. 1, and updates values of the variables in the temporary data memory 17 according to the calculation results in step S18. The temporary data memory 17 is, for example, a storage region which is secured in a main memory of a computer in which the search system is embedded. Data (data regarding the attribution degree of the node n to the cluster k indicated by the above Equation (IV)) regarding the clustering result obtained through the execution by the clustering processor 16 is reserved in a clustering result storage device 18. When learning about the clustering is performed using the learning data for each user, a clustering result for each user is reserved, for example, in a form correlated with a user ID.

The search processor 20 receives a query from a user and executes the search process in FIG. 2 in real time in relation to the query (online process). In this process, the search processor 20 targets the detailed information (for example, text information of each web page) of each node stored in the network information storage device 10, executes primary search (S30 in FIG. 2) on the basis of a search condition of the user query, and obtains a seed node set. In addition, the processes in steps S32 to S36 are performed using the obtained seed node set and the information regarding the clustering result of the user stored in the clustering result storage device 18, and thereby a node group which is a target of the PPR operation (S40) is selected. Further, a partial network formed only by the selected node group is generated from the information regarding the network structure stored in the network information storage device 10 (S38). In addition, PPR values of the respective nodes are obtained by performing the PPR operation (S40) for the partial network, and the nodes are ranked based on the PPR values (S42), and a response is sent to the user on the basis of the ranking result (S44). Further, the search processor 20 writes the work data when executing the above-described processes, for example, the process results in steps S30 to S38, the calculation result for each iteration in the PPR algorithm in step S40, the ranking result in step S42, and the like in a temporary data memory 22, and uses the data in the temporary data memory 22 for calculation in the respective subsequent steps.

Another Example of Clustering

In the above description, a description has been made of the system in which Markov chains on a network are clustered, and the network is searched using information of a cluster obtained as a result thereof. However, the clustering method described using the above-described system is only an example. Therefore, in the following, another example of the method of clustering Markov chains on a network will be described.

In the above-described example, parameters such as core and enlargement of clusters are used for clustering. In contrast, in this example, these parameters are not used. However, a transition between nodes does not follow a transition probability matrix, and it is assumed that errors according to a certain probability distribution occur with respect to the transition probability matrix in this example as well.

Both the above-described example and this example use Markov chains on a network. The reason why attention is paid to the Markov chains is that the Markov chains on the network can be defined completely naturally even in a case where a link has a direction or even in a case where the link has a weight of an analog value.

It can be understood that the Markov chains on the network indicate movements of an agent (random walker) which follows links and moves on the network at random. If the network is constituted by a plurality of clusters (portions with high link density: also referred to as communities), a movement of the random walker corresponds to a case in which the random walker stays in a region corresponding to a cluster for a while, then moves to a region corresponding to another cluster and stays therein for a while, and, then moves to a region corresponding to still another cluster and stays therein for a while . . . .

It is assumed that information regarding in which side the random walker is currently present is obtained. A procedure in which this information is generated is shown by the following probability model.

(1) The random walker on a network is present in a region corresponding to any one of clusters (hereinafter, also referred to as "communities") and moves about there at random. Which region the random walker is present is defined stochastically.

(2) As a result of observing a location where the random walker moving about a region corresponding to the cluster defined stochastically in (1) is currently present, information regarding which side the random walker is present is obtained.

It is assumed that an observation is performed several times independently, and thus a large amount of data regarding a location where the random walker is present is collected. By assigning the data to the probability model, "likelihood" is obtained. The likelihood is a function of a (temporarily determined) clustering structure or a (temporarily determined) community structure. Therefore, a clustering structure (community structure) is set so as to maximize the likelihood. This is a clustering structure (community structure) to be obtained (seemingly to be the most reliable).

In this example as well, a target network is expressed by an adjacent matrix A.

[Expression 87]

$$A=(A_{nm}). \quad (3.1)$$

Here, n and m are 1, 2, . . . , and N, and N is a total number of nodes included in the network. In addition, in the example of the above-described system, an element $A_{nm}$ of the n-th row and the m-th column of the adjacent matrix has a value of either 0 or 1, that is, 1 if there is a link from a node m to a node n on a network, and 0 if there is no link thereon. In contrast, in the following example, the element $A_{nm}$ does not have a value of either 0 or 1 but has an analog value, that is, any one value in a certain continuous numerical value range (for example, a real number of 0 to 1). A value of the element $A_{nm}$ indicates the intensity (weight) of a link from the node m to the node n.

Markov chains on the network are present in propagation of a probability in this network and are indicated by the following Expression.

[Expression 88]

$$\vec{p}(t)=T\vec{p}(t-1) \quad (3.2a)$$

The n-th component $p_n(t)$ of the vector p(t) is a probability density allocated to the node n at the time point t and is indicated by the following Expression.

[Expression 89]

$$p_n(t)=\Sigma_{m=1}^{N} T_{nm} p_m(t-1) \quad (3.2n)$$

Here, the matrix T is a transition probability matrix of the Markov chains and is indicated by the following Expression.

[Expression 90]

$$T=(T_{nm})\equiv(A_{nm}/\Sigma_n A_{n'm}) \quad (3.3)$$

The transition probability matrix T satisfies the following Expression.

[Expression 91]

$$\Sigma_{n=1}^{N} T_{nm}=1, \quad (3.4)$$

Thereby, the conservation law of probability is established.

[Expression 92]

$$\Sigma_{n=1}^{N} p_n(t)=C(\text{constant with } t). \quad (3.5a)$$

Here, the following Expression is given.

[Expression 93]

$$C=1 \quad (3.5b)$$

With this setting, the Markov chains can be regarded as a random walker which is an agent present on a network, and $p_n(t)$ can be understood as a probability that the agent (random walker) may be found at the node n at the time point t (that is, present on the node n at the time point t).

The "overall" Markov chains indicated by Equations (3.2a) and (3.2b) may be clustered using K "local" Markov chains indicated by the following Expression 94.

[Expression 94]

$$\vec{p}^{(k)}=(p_1^{(k)}, \ldots, p_N^{(k)})^T (k=1, \ldots, K)$$

These K clusters (local Markov chains) may have a portion overlapping each other (that is, a node belonging to plural clusters).

A set (following Expression) of D learning data items is prepared for this clustering.

[Expression 95]

$$\{\vec{\tau}^{(1)},\ldots,\vec{\tau}^{(D)}\} \quad (4.1)$$

Here, the following Expression 96 is given.

$$\vec{\tau}^{(d)}=(\tau_1^{(d)},\ldots,\tau_N^{(d)})^T (d=1,\ldots,D) \quad [\text{Expression 96}]$$

The set of learning data may use, for example, a result of performing D observations of a presence position of any random walker on a network with the passage of time. For example, in a case where the random walker is found on the node m when the d-th observation is performed, the observation result is expressed by the following Expression.

$$\tau_n^{(d)}=\delta_{mn} \quad [\text{Expression 97}]$$

Here, $\delta_{mn}$ is Kronecker's $\delta$. In other words, learning data obtained from a certain observation d is an N-dimensional vector of which the m-th component corresponding to the node m where the random walker is present when the observation is performed is 1, and the other components are 0. Assuming that the number D of learning data items is sufficiently greater than the number N of nodes on the network, it is considered that, among D, $\tau^{(d)}$ appears $Dp_m^{(PR)}$ times. Here, $p_m^{(PR)}$ is the m-th component in a steady state of the Markov chains (Equations (3.2a) and (3.2b)), calculated independently in advance. At this time, it is not necessary to obtain a sum total of 1 to D as m in Equation (3.2b), and, only a sum total of 1 to N as m may be calculated in consideration of overlapping.

A framework of clustering using the learning data follows a method shown in the chapter IX of the above-described Bishop's book "Pattern recognition and machine learning".

First, a K-dimensional binary random variable (following Expression 98) is introduced.

$$\vec{z}^{(d)}=(z_{d1},\ldots,z_{dK})^T \quad [\text{Expression 98}]$$

Here, K is a total number of clusters to be generated through clustering. In addition, here, a specific component (following Expression 99) of K components of the random variable is 1, and the other components are 0.

$$z_{dk} \quad [\text{Expression 99}]$$

Here, the following Expression 100 is set as a prior probability of the following Expression 101.

[Expression 100]

$$P(\vec{z}^{(d)})=\Pi_{k=1}^{K}(\pi_k)^{z_{dk}} \quad (4.2a)$$

$$\vec{z}^{(d)} \quad [\text{Expression 101}]$$

In this case, the following Expression is established.

[Expression 102]

$$P(z_{dk}=1)=\pi_k. \quad (4.2b)$$

Here, a joint probability, that is, the following Expression 103 is considered.

[Expression 103]

$$P(\{\vec{\tau}^{(d)}\},\{\vec{z}^{(d)}\},\{\vec{p}^{(k)}(t)\})=[\Pi_{d=1}^{D}\Pi_{k=1}^{K}\{\pi_k P(\vec{\tau}^{(d)}|\vec{p}^{(k)}(t))\}^{z_{dk}}]\times[\Pi_{k=1}^{K}P(\vec{p}^{(k)}(t)|\vec{I}^{(k)}(t-1))] \quad (4.3)$$

This joint probability is a probability which has the learning data $\tau^{(d)}$, a binary latent variable $z_{dk}$ indicating that the cluster k is selected, and the active vector $p^{(k)}$, as variables. Here, the following Expression is given.

[Expression 104]

$$\vec{I}^{(k)}(t-1)\equiv T\vec{p}^{(k)}(t-1) \quad (4.4a)$$

$$I_n^{(k)}(t-1)\Sigma_{m=1}^{N}T_{nm}p_m^{(k)}(t-1). \quad (4.4b)$$

In Equation (4.3), the following Expression 105 is a prior probability of the following Expression 106, and this is selected such that the following Expression 107 can be generated most easily.

$$P(\vec{p}^{(k)}|\vec{I}^{(k)}(t-1)) \quad [\text{Expression 105}]$$

$$\vec{p}^{(k)}(t) \quad [\text{Expression 106}]$$

$$\vec{p}^{(k)}(t)=\vec{I}^{(k)}(t-1) \quad [\text{Expression 107}]$$

Here, the following Expression 108 is a probability of the following Expression 110 when the following Expression 109 is given (that is, a likelihood function of the following Expression 111).

$$P(\vec{\tau}^{(d)}|\vec{p}^{(k)}(t)) \quad [\text{Expression 108}]$$

$$\vec{p}^{(k)}(t) \quad [\text{Expression 109}]$$

$$\vec{\tau}^{(d)} \quad [\text{Expression 110}]$$

$$\vec{p}^{(k)}(t) \quad [\text{Expression 111}]$$

The following Expression can be obtained from the Bayesian theorem.

[Expression 112]

$$\gamma_{dk} \equiv P\left(z_{kd}=1 \mid \vec{\tau}^{(d)}\right) \quad (4.5)$$

$$= \frac{P(z_{kd}=1)P\left(\vec{\tau}^{(d)} \mid z_{kd}=1\right)}{\sum_{j(d)} P(z_{kd}=1)P(\vec{\tau}^{(d)} \mid z_{kd}=1)}$$

$$= \frac{\pi_k P\left(\vec{\tau}^{(d)} \mid \vec{p}^{(k)}\right)}{\sum_{k=1}^{K}\pi_k P\left(\vec{\tau}^{(d)} \mid \vec{p}^{(k)}\right)}.$$

A logarithm of the joint probability is taken according to the method shown in Bishop's book.

[Expression 113]

$$\ln P(\{\vec{p}^{(k)}\},\{\vec{z}^{(d)}\},\{\vec{\tau}^{(d)}\})$$

$$=\Sigma_{k=1}^{K}\Sigma_{d=1}^{D}z_{dk}\ln \pi_k+\Sigma_{k=1}^{K}\Sigma_{d=1}^{D}z_{dk}\ln P(\vec{\tau}^{(d)}|\vec{p}^{(k)}(t))+\Sigma_{k=1}^{K}\ln P\vec{p}^{(k)}(t)|\vec{I}^{(k)}(t-1)) \quad (4.6)$$

Here, an expected value Q of the logarithm of the joint probability is obtained as in the following Expression 115 using the posterior of the following Expression 114.

[Expression 114]

$$P(\{\vec{z}^{(d)}\}|\{\vec{\tau}^{(d)}\})=\Pi_{d=1}^{D}P(\vec{z}^{(d)}|\vec{\tau}^{(d)}) \quad (4.7)$$

[Expression 115]

$$Q \equiv E\left[\ln P\left(\{\vec{\tau}^{(d)}\}, \{\vec{z}^{(d)}\}, \{\vec{p}^{(k)}\}\right)\right]_{P\left(\{\vec{z}^{(d)}\}|\{\vec{\tau}^{(d)}\}\right)} \quad (4.8)$$

$$= \sum_{k=1}^{K}\sum_{d=1}^{D}\gamma_{dk}\ln\pi_k + \sum_{k=1}^{K}\sum_{d=1}^{D}\gamma_{dk}\ln P\left(\vec{\tau}^{(d)}\mid\vec{p}^{(k)}(t)\right) +$$

$$\sum_{k=1}^{K}\ln P\left(\vec{p}^{(k)}(t)\mid\vec{I}^{(k)}(t-1)\right).$$

A relationship of the following Expression is used to derive the right side of Equation (4.8).

[Expression 116]

$$E[z_{dk}]_{P\left(\{\vec{z}^{(d')}\}|\{\vec{\tau}^{(d')}\}\right)} = \sum_{\{\vec{z}^{(d')}\}} z_{dk}\frac{P\left(\{\vec{z}^{(d')}\}\mid\{\vec{\tau}^{(d)}\}\right)}{\prod_{d'=1}^{D}P\left(\vec{z}^{(d)}\mid\vec{\tau}^{(d)}\right)} \quad (4.9)$$

$$= \sum_{z_{dk}=1,0} z_{dk} P\left(\vec{z}^{(d)}\mid\vec{\tau}^{(d)}\right)$$

$$= P\left(z_{dk}=1\mid\vec{\tau}^{(d)}\right)$$

$$= \gamma_{dk}.$$

Although, in the above-described system, an example (refer to Equation (1.1)) of using the Gaussian distribution as a distribution of prior probabilities (prior distribution) has been described, in the following, examples of the cases of respectively using the Gaussian distribution and the Dirichlet distribution as a prior distribution will be described.

Markov Chains Clustering Using Gaussian Prior Distribution

When the Gaussian distribution is used as a prior distribution, the joint probability is indicated as follows.

[Expression 117]

$$P\left(\{\vec{\tau}^{(d)}\}, \{\vec{z}^{(d)}\}, \{\vec{p}^{(k)}(t)\}\right) = \left[\prod_{d=1}^{D}\prod_{k=1}^{K}\left\{\pi_k \frac{1}{(2\pi\beta)^{N/2}}\exp\left[-\frac{1}{2}\beta\left(\vec{\tau}^{(d)}-\vec{p}^{(k)}(t)\right)^2\right]\right\}^{z_{dk}}\right] \times \quad (5.1)$$

$$\left[\prod_{k=1}^{K}\frac{1}{(2\pi\alpha)^{N/2}}\exp\left[-\frac{1}{2}\alpha\left(\vec{p}^{(k)}(t)-\vec{I}^{(k)}(t-1)\right)^2\right]\right]$$

$$= \left[\prod_{d=1}^{D}\prod_{k=1}^{K}\left\{\pi_k^{z_{dk}}\frac{1}{(2\pi\beta)^{z_{dk}N/2}}\exp\left[-\frac{1}{2}z_{dk}\beta\left(\vec{\tau}^{(d)}-\vec{p}^{(k)}(t)\right)^2\right]\right\}\right] \times$$

$$\left[\prod_{k=1}^{K}\frac{1}{(2\pi\alpha)^{N/2}}\exp\left[-\frac{1}{2}\alpha\left(\vec{p}^{(k)}(t)-\vec{I}^{(k)}(t-1)\right)^2\right]\right]$$

$$= \left[\prod_{k=1}^{K}\left\{\pi_k^{\Sigma_{d=1}^{D}z_{dk}}\frac{1}{(2\pi\beta)^{(N/2)\Sigma_{d=1}^{D}z_{dk}}}\exp\left[-\frac{1}{2}\sum_{d=1}^{D}z_{dk}\beta\left(\vec{\tau}^{(d)}-\vec{p}^{(k)}(t)\right)^2\right]\right\}\right] \times$$

$$\left[\prod_{k=1}^{K}\frac{1}{(2\pi\alpha)^{N/2}}\exp\left[-\frac{1}{2}\alpha\left(\vec{p}^{(k)}(t)-\vec{I}^{(k)}(t-1)\right)^2\right]\right].$$

From the Bayesian theorem, the following relationship is obtained.

[Expression 118]

$$\gamma_{dk} \equiv P\left(z_{kd}=1\mid\vec{\tau}^{(d)}\right) \quad (5.2)$$

$$= \frac{P(z_{kd}=1)P\left(\vec{\tau}^{(d)}\mid z_{kd}=1\right)}{\sum_{\vec{z}^{(d)}} P(z_{kd}=1)P\left(\vec{\tau}^{(d)}\mid z_{kd}=1\right)}$$

$$= \frac{\pi_k \cdot \frac{1}{(2\pi\alpha)^{N/2}}\exp\left[-\frac{1}{2}\beta\left(\vec{\tau}^{(d)}-\vec{p}^{(k)}(t)\right)^2\right]}{\sum_{k=1}^{K}\pi_k \frac{1}{(2\pi\alpha)^{N/2}}\exp\left[-\frac{1}{2}\beta\left(\vec{\tau}^{(d)}-\vec{p}^{(k)}(t)\right)^2\right]}$$

$$= \frac{\pi_k \exp\left[-\frac{1}{2}\beta\left(\vec{\tau}^{(d)}-\vec{p}^{(k)}(t)\right)^2\right]}{\sum_{k=1}^{K}\pi_k \exp\left[-\frac{1}{2}\beta\left(\vec{\tau}^{(d)}-\vec{p}^{(k)}(t)\right)^2\right]}.$$

As described above, the following Expression 119 is given, and thus a logarithm of the joint probability is as in the following Expression 120.

[Expression 119]

$$P\left(\{\vec{\tau}^{(d)}\}, \{\vec{z}^{(d)}\}, \{\vec{p}^{(k)}\}\right) = \quad (5.3)$$

$$\prod_{k=1}^{K}\left\{\pi_k^{\Sigma_{d=1}^{D}z_{dk}}\frac{1}{(2\pi\beta)^{(N/2)\Sigma_{d=1}^{D}z_{dk}}}\frac{1}{(2\pi\alpha)^{N/2}}\exp\right.$$

$$\left.\left[-\frac{1}{2}\sum_{d=1}^{D}z_{dk}\beta\left(\vec{\tau}^{(d)}-\vec{p}^{(k)}(t)\right)^2 - \frac{1}{2}\alpha\left(\vec{p}^{(k)}(t)-\vec{I}^{(k)}(t-1)\right)^2\right]\right\}$$

-continued

[Expression 120]

$$\ln P(\{\vec{\tau}^{(d)}\}, \{\vec{z}^{(d)}\}, \{\vec{p}^{(k)}\}) = \qquad (5.4)$$

$$\sum_{k=1}^{K}\sum_{d=1}^{D} z_{dk}\ln \pi_k + \frac{N}{2}\underbrace{\sum_{k=1}^{K}\sum_{d=1}^{D} z_{dk}}_{=D}\ln 2\pi\beta + \frac{NK}{2}\ln 2\pi\alpha +$$

$$\sum_{k=1}^{K}\left[-\frac{1}{2}\sum_{d=1}^{D} z_{dk}\beta(\vec{\tau}^{(d)} - \vec{p}^{(k)}(t))^2 - \frac{1}{2}\alpha(\vec{p}^{(k)}(t) - \vec{I}^{(k)}(t-1))^2\right].$$

Therefore, an expected value Q of the logarithm of the joint probability is as follows.

[Expression 121]

$$Q \equiv E\left[\ln P(\{\vec{\tau}^{(d)}\}, \{\vec{z}^{(d)}\}, \{\vec{p}^{(k)}\})\right]_{P(\{\vec{z}^{(d)}\}|\{\vec{\tau}^{(d)}\})} \qquad (5.5)$$

$$= \sum_{k=1}^{K}\sum_{d=1}^{D} \gamma_{dk}\ln \pi_k + \frac{ND}{2}\ln 2\pi\beta + \frac{NK}{2}\ln 2\pi\alpha +$$

$$\sum_{k=1}^{K}\left[-\frac{1}{2}\sum_{d=1}^{D} \gamma_{dk}\beta(\vec{\tau}^{(d)} - \vec{p}^{(k)}(t))^2 - \frac{1}{2}\alpha(\vec{p}^{(k)}(t) - \vec{I}^{(k)}(t-1))^2\right]$$

$$= \sum_{k=1}^{K}\sum_{d=1}^{D} \gamma_{dk}\ln \pi_k + \frac{ND}{2}\ln 2\pi\beta + \frac{NK}{2}\ln 2\pi\alpha +$$

$$\sum_{k=1}^{K}\left[\begin{array}{c}-\frac{1}{2}\beta\sum_{d=1}^{D}\gamma_{dk}\sum_{n=1}^{N}(p_n^{(k)}(t)-\tau_n^{(d)})^2 - \\ \frac{1}{2}\alpha\sum_{n=1}^{N}(p_n^{(k)}(t)-I_n^{(k)}(t-1))^2\end{array}\right],$$

The following relationship is used for this derivation.

[Expression 122]

$$E[z_{dk}]_{P(\{\vec{z}^{(d')}\}|\{\vec{\tau}^{(d')}\})} = \sum_{\{\vec{z}^{(d')}\}} z_{dk}\frac{P(\{\vec{z}^{(d')}\}|\{\vec{\tau}^{(d')}\})}{\prod_{d'=1}^{D}P(\vec{z}^{(d')}|\vec{\tau}^{(d')})} \qquad (5.6)$$

$$= \sum_{z_{dk}=1,0} z_{dk}P(z_{dk}|\vec{\tau}^{(d)})$$

$$= P(z_{dk} = 1 | \vec{\tau}^{(d)})$$

$$= \gamma_{dk}.$$

Here, the expected value Q is maximized with respect to the following Expression 123.

$$p_n^{(k)}(t) \qquad \text{[Expression 123]}$$

Thereby, the following relational expression is obtained.

[Expression 124]

$$p_n^{(k)}(t) = \frac{\alpha}{\alpha + \beta D_k}I_n^{(k)}(t-1) + \frac{\beta\sum_{d=1}^{D}\gamma_{dk}\tau_n^{(d)}}{\alpha + \beta D_k}. \qquad (5.7)$$

Here, the following Expression is given.

[Expression 125]

$$D_k = \sum_{d=1}^{D}\gamma_{dk}. \qquad (5.8)$$

In addition, Equation (5.7) is derived as follows.

[Expression 126]

$$\frac{\partial Q}{\partial p_n^{(k)}(t)} = 0:$$

$$\alpha(p_n^{(k)}(t) - I_n^{(k)}(t-1)) + \beta\sum_{d=1}^{D}\gamma_{dk}(p_n^{(k)}(t) - \tau_n^{(d)}) = 0.$$

$$\left(\alpha + \beta\underbrace{\sum_{d=1}^{D}\gamma_{dk}}_{=D_k}\right)p_n^{(k)}(t) = \alpha I_n^{(k)}(t-1) + \beta\sum_{d=1}^{D}\gamma_{dk}\tau_n^{(d)}.$$

$$\therefore p_n^{(k)}(t) = \frac{\alpha}{\alpha + \beta D_k}I_n^{(k)}(t-1) + \frac{\beta\sum_{d=1}^{D}\gamma_{dk}\tau_n^{(d)}}{\alpha + \beta D_k}.$$

Here, if the following Expression 127 is set, the following Expression 128 satisfies the conservation law of probability.

$$\Sigma_{n=1}^{N}p_n^{(k)}(t-1)=1 \qquad \text{[Expression 127]}$$

$$\vec{p}^{(k)}(t) \qquad \text{[Expression 128]}$$

That is to say, this leads to the following Expression 129.

[Expression 129]

$$\Sigma_{n=1}^{N}p_n^{(k)}(t)=1. \qquad (5.9)$$

The reason is as follows.

[Expression 130]

$$\sum_{n=1}^{N}p_n^{(k)}(t) = \sum_{n=1}^{N}\left[\frac{\alpha}{\alpha+\beta D_k}I_n^{(k)}(t-1) + \frac{\beta\sum_{d=1}^{D}\gamma_{dk}\tau_n^{(d)}}{\alpha+\beta D_k}\right]$$

$$= \frac{\alpha}{\alpha+\beta D_k}\sum_{n=1}^{N}I_n^{(k)}(t-1) + \frac{\beta\sum_{d=1}^{D}\gamma_{dk}\sum_{n=1}^{N}\tau_n^{(d)}}{\alpha+\beta D_k}$$

$$= \frac{\alpha}{\alpha+\beta D_k}\sum_{n=1}^{N}\sum_{m=1}^{N}T_{mn}p_m^{(k)}(t-1) + \frac{\beta\sum_{d=1}^{D}\gamma_{dk}}{\alpha+\beta D_k}$$

$$= \frac{\alpha}{\alpha+\beta D_k}\sum_{m=1}^{N}p_m^{(k)}(t-1) + \frac{\beta\sum_{d=1}^{D}\gamma_{dk}}{\alpha+\beta D_k}$$

$$= \frac{\alpha}{\alpha+\beta D_k} + \frac{\beta D_k}{\alpha+\beta D_k}$$

$$= 1.$$

Here, under the restriction of the following Expression 131, Q is maximized with respect to the following Expression 132, which leads to the following Expression 133.

$$\Sigma_{k=1}^{K}\pi_k=1 \qquad \text{[Expression 131]}$$

$$\pi_k \qquad \text{[Expression 132]}$$

[Expression 133]

$$\pi_k = \frac{D_k}{D}. \quad (5.10)$$

In a case where the number D of learning data items is sufficiently greater than the number N of nodes of the network, the expected value Q of Equation (5.5) can be approximated as follows.

[Expression 134]

$$Q \equiv E\left[\ln P\left(\{\vec{\tau}^{(d)}\}, \{\vec{z}^{(d)}\}, \{\vec{p}^{(k)}\}\right)\right]_{P\left(\{\vec{z}^{(d)}\}|\{\vec{\tau}^{(d)}\}\right)} \quad (5.11)$$

$$= \sum_{k=1}^{K}\sum_{d=1}^{N} D p_d^{(PR)} \gamma_{dk} \ln \pi_k + \frac{ND}{2}\ln 2\pi\beta + \frac{NK}{2}\ln 2\pi\alpha +$$

$$\sum_{k=1}^{K}\left[\begin{array}{c} -\frac{1}{2}\beta\sum_{d=1}^{N} D p_d^{(PR)}\gamma_{dk}\sum_{n=1}^{N}(p_n^{(k)}(t)-\tau_n^{(d)})^2 - \\ \frac{1}{2}\alpha\sum_{n=1}^{N}(p_n^{(k)}(t)-I_n^{(k)}(t-1))^2 \end{array}\right]$$

Here, the following Expression 135 is a probability distribution over all the nodes on the network in a steady state of the Markov chains (3.2a) and (3.2b). That is to say, the following Expression 136 satisfies the following Expression 137.

$$\vec{p}^{(PR)} = (p_1^{(PR)}, \ldots, p_N^{(PR)})^T \quad \text{[Expression 135]}$$

$$\vec{p}^{(PR)} \quad \text{[Expression 136]}$$

[Expression 137]

$$\vec{p}^{(PR)} = T\vec{p}^{(PR)} \quad (5.12a)$$

$$p_n^{(PR)} = \sum_{m=1}^{N} T_{nm} p_m^{(PR)} \quad (5.12b)$$

In addition, the expected value Q is maximized with respect to the following Expression 138, which leads to the following Expression 139.

$$p_n^{(k)}(t) \quad \text{[Expression 138]}$$

[Expression 139]

$$p_n^{(k)}(t) = \frac{\alpha}{\alpha + \beta D \sum_{d=1}^{N} p_d^{(PR)}\gamma_{dk}} I_n^{(k)}(t-1) + \frac{\beta D \sum_{d=1}^{N} p_d^{(PR)}\gamma_{dk}\tau_n^{(d)}}{\alpha + \beta D \sum_{d=1}^{N} p_d^{(PR)}\gamma_{dk}}. \quad (5.13)$$

Further, under the restriction of the following Expression 140, the expected value Q is maximized with respect to the following Expression 141, which leads to the following Expression 142.

$$\sum_{k=1}^{K} \pi_k = 1 \quad \text{[Expression 140]}$$

$$\pi_k \quad \text{[Expression 141]}$$

[Expression 142]

$$\pi_k = \frac{D\sum_{d=1}^{N} p_d^{(PR)}\gamma_{dk}}{D} = \sum_{d=1}^{N} p_d^{(PR)}\gamma_{dk}. \quad (5.14)$$

Figure 4:
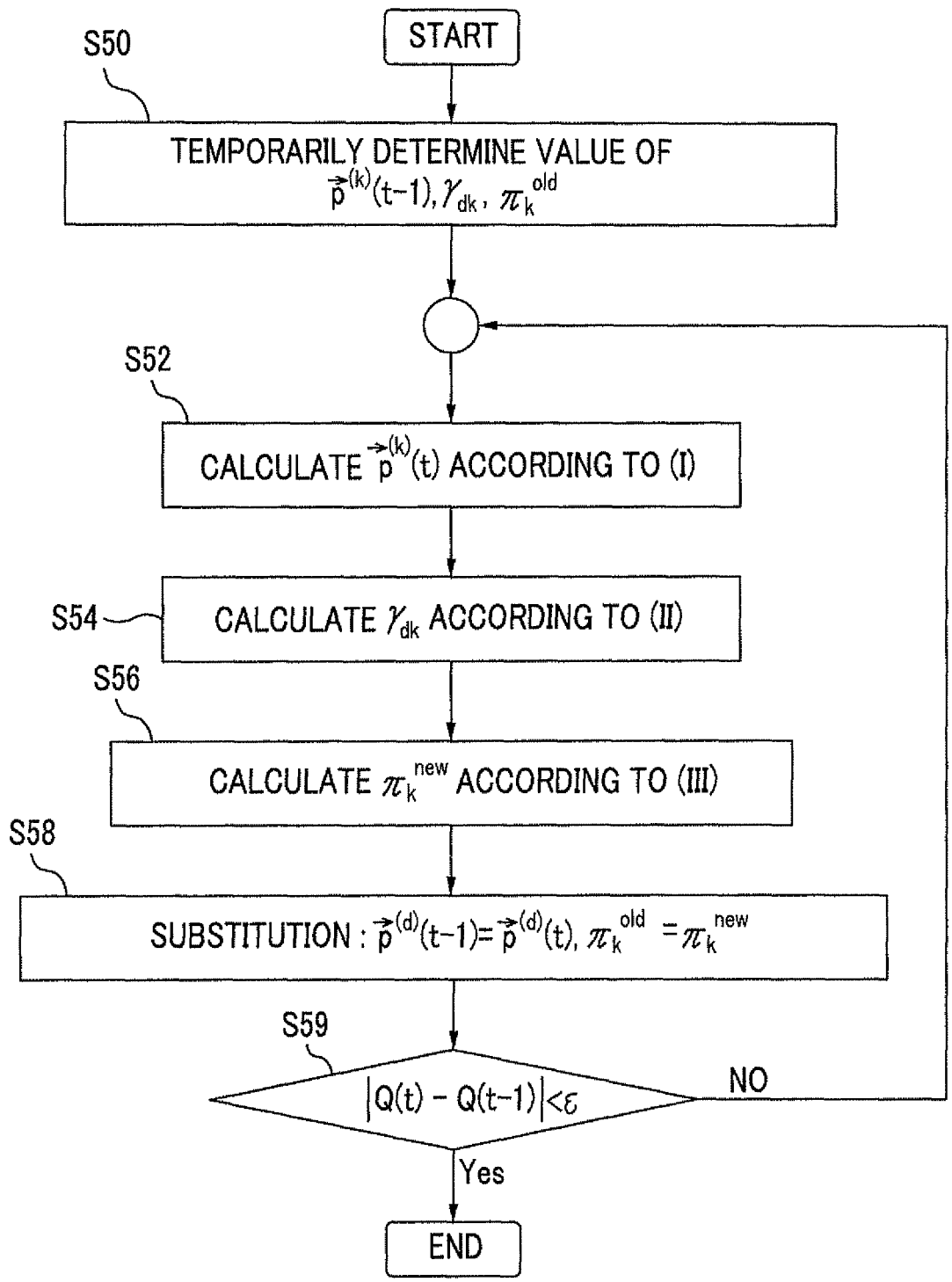
FIG. 4 is a flowchart illustrating another example of the procedure of a clustering process of Markov chains.

To summarize, a flow of the clustering process in this example is as shown in FIG. 4.

In this example, the Markov chains regarding the learning data d are expressed by the following Equation (I) (the same as the above Equations (5.7) and (5.8)).

[Expression 143]

$$p_n^{(k)}(t) = \frac{\alpha}{\alpha + \beta D_k} I_n^{(k)}(t-1) + \frac{\beta\sum_{d=1}^{D}\gamma_{dk}\tau_n^{(d)}}{\alpha + \beta D_k} \quad (I)$$

Here, the following Expression 144 is given.

$$D_k = \sum_{d=1}^{D} \gamma_{dk} \quad \text{[Expression 144]}$$

In other words, the active vector $p^{(k)}$ undergoes dynamics according to this Equation (I) when a time step proceeds from (t−1) to t.

In the clustering process, for example, as shown in step S50 of FIG. 4, values of the variables included in the respective terms of the right side of Equation (I) are temporarily determined. In addition, the transition probability matrix T is assumed to be obtained in advance based on a link structure or the like of the network, for example, in the same method as in the case of the PageRank algorithm. Further, α and β are variances of the Gaussian distribution shown in Equation (5.2) and Equation (5.3), and these values are designated by a user. Depending on the temporarily determined following Expression 145, the following Expression 146 of the right side of Equation (I) is set (refer to Equations (4.4a) and (4.4b)).

$$\vec{p}^{(k)}(t-1) \quad \text{[Expression 145]}$$

$$\vec{I}^{(k)}(t-1) \quad \text{[Expression 146]}$$

After the variables are temporarily determined as such (S50), the following Expression 147 is calculated using Equation (I) (S52).

$$\vec{p}^{(k)}(t) \quad \text{[Expression 147]}$$

Next, the attribution degree $\gamma_{dk}$ is calculated using the following Equation (II) (refer to the above Equation (5.2)) (S54).

[Expression 148]

$$\gamma_{dk} = \frac{\pi_k^{old}\exp\left[-\frac{1}{2}\beta(\vec{\tau}^{(d)}-\vec{p}^{(k)}(t))^2\right]}{\sum_{k=1}^{K}\pi_k^{old}\exp\left[-\frac{1}{2}\beta(\vec{\tau}^{(d)}-\vec{p}^{(k)}(t))^2\right]} \quad (II)$$

Next, $\pi_k^{new}$ is calculated using the following Equation (III) (S56).

[Expression 149]

$$\pi_k^{new} = \frac{D_k}{D} \quad \text{(III)}$$

In addition, in a case where the number D of learning data items is sufficiently greater than the number N of nodes of the network, the following may be used as Equations (I), (II) and (III).

[Expression 150]

$$p_n^{(k)}(t) = \frac{\alpha}{\alpha + \beta D \sum_{d=1}^{N} p_d^{(PR)} \gamma_{dk}} I_n^{(k)}(t-1) + \frac{\beta D \sum_{d=1}^{N} p_d^{(PR)} \gamma_{dk} \tau_n^{(d)}}{\alpha + \beta D \sum_{d=1}^{N} p_d^{(PR)} \gamma_{dk}}. \quad \text{(I)}$$

$$\gamma_{dk} = \frac{\pi_k^{old} \exp\left[-\frac{1}{2}\beta\left(\vec{\tau}^{(d)} - \vec{p}^{(k)}(t)\right)^2\right]}{\sum_{k=1}^{K} \pi_k^{old} \exp\left[-\frac{1}{2}\beta\left(\vec{\tau}^{(d)} - \vec{p}^{(k)}(t)\right)^2\right]} \quad \text{(II)}$$

$$\pi_k^{new} = \sum_{d=1}^{N} p_d^{(PR)} \gamma_{dk} \quad \text{(III)}$$

When the calculations in steps S52, S54 and S56 are completed as described above, in order to perform the subsequent iterative operations, the values of the respective variables obtained using Equations (I) to (III) are set as variables (a probability and variables with the superscript old at the time point t−1) indicating values before one step (S58).

In addition, an evaluation value Q is obtained using Equation (5.5) (in a case where D is sufficiently greater than N, using Equation (5.11)), it is determined whether or not a difference between the obtained evaluation value Q and the evaluation value Q obtained at the time point (t−1) before one step is sufficiently small (for example, an absolute value of the difference is smaller than a predefined threshold value ε) (S59). That is to say, in step S59, it is determined whether or not the iterative operations with dynamics converge. If the determination result is negative (NO: a difference between the present and previous evaluation values Q is not sufficient small, that is, does not converge), the time point t progresses by 1, and the processes from step S52 to S58 are repeatedly performed. If the determination result in step S59 is affirmative (Y), the process of FIG. 4 finishes.

Equation (I) when the process of FIG. 4 finishes indicates partial Markov chains of the cluster k. As such, in the procedures shown in FIG. 4, Equations (I) to (III) are iteratively calculated while the time step progresses by one step, thus the parameters $D_k$ and $\gamma_{dk}$ in Equation (I) are adjusted, and thereby a form of each cluster k is defined.

In addition, although, in this example, it is determined that the iterative operations converge if a difference between evaluation values (expected values) Q for the respective time steps is sufficiently small, and the iterative operations (the process loop from steps S52 to S59) finish, this is only an example. The upper limit number of iterative operations may be preset, and the iterative operations may finish when the number of iterative operations to be performed arrives at the upper limit number even if the iterative operations do not converge. In this case, Equation (I) including the respective parameters $D_k$ and $\gamma_{dk}$ at the point when the iterative operations finish may be used an expression for regulating each cluster k of the Markov chains.

Markov Chains Clustering Using Dirichlet Prior Distribution

When the Dirichlet distribution is used as a prior distribution, the joint probability is indicated as follows.

[Expression 151]

$$P\left(\{\vec{\tau}^{(d)}\}, \{\vec{z}^{(d)}\}, \{\vec{p}^{(t)}(t)\}\right) = \prod_{d=1}^{D} \prod_{k=1}^{K} \left\{\pi_k \prod_{n=1}^{N} [p_n^{(k)}(t)]^{\beta \tau_n^{(d)}}\right\}^{z_{dk}} \times \quad (6.1)$$

$$\prod_{l=1}^{K} \frac{1}{Z_l} [p_n^{(l)}(t)]^{\alpha I_n^{(l)}(t-1)+l-1}$$

$$= \prod_{d=1}^{D} \prod_{k=1}^{K} \left\{\pi_k^{z_{dk}} \prod_{n=1}^{N} [p_n^{(k)}(t)]^{\beta z_{dk} \tau_n^{(d)}}\right\} \times$$

$$\prod_{l=1}^{K} \frac{1}{Z_l} [p_n^{(l)}(t)]^{\alpha I_n^{(l)}(t-1)+l-1}$$

$$= \prod_{k=1}^{K} \left\{\pi_k^{\sum_{d=1}^{D} z_{dk}} \prod_{n=1}^{N} [p_n^{(k)}(t)]^{\beta \sum_{d=1}^{D} z_{dk} \tau_n^{(d)}}\right\} \times$$

$$\prod_{l=1}^{K} \frac{1}{Z_l} [p_n^{(l)}(t)]^{\alpha I_n^{(l)}(t-1)+l-1}.$$

In addition, in this Expression, parameters of the Dirichlet distribution are respectively defined as follows.

$$\beta \tau_n^{(d)} + 1 \qquad \text{[Expression 152]}$$

$$\alpha I_n^{(l)}(t-1) + 1 \qquad \text{[Expression 153]}$$

By defining as such, for example, if the following Expression is 0, probabilities of all patterns which may occur are uniform (refer to FIG. 2.5 of Bishop's book).

$$I_n^{(l)}(t-1) \text{[Expression 154]}$$

The following Equation is obtained from the Bayesian theorem.

[Expression 155]

$$\gamma_{dk} \equiv P\left(z_{kd} = 1 \mid \vec{\tau}^{(d)}\right) \equiv \frac{P(z_{kd}=1)P\left(\vec{\tau}^{(d)} \mid z_{kd}=1\right)}{\sum_{\vec{z}^{(d)}} P(z_{kd}=1)P\left(\vec{\tau}^{(d)} \mid z_{kd}=1\right)} = \quad (6.2)$$

$$\frac{\pi_k \prod_{n=1}^{N} [p_n^{(k)}(t)]^{\beta \tau_n^{(d)}} \times \prod_{l=1}^{K} [p_n^{(l)}(t)]^{\alpha I_n^{(l)}(t-1)-l-1}}{\sum_{k=1}^{K} \pi_k \prod_{n=1}^{N} [p_n^{(k)}(t)]^{\beta \tau_n^{(d)}} \times \prod_{l=1}^{K} [p_n^{(l)}(t)]^{\alpha I_n^{(d)}(t-1)+-l-1}} =$$

$$\frac{\pi_k \prod_{n=1}^{N} [p_n^{(k)}(t)]^{\beta \tau_n^{(d)}}}{\sum_{k=1}^{K} \pi_k \prod_{n=1}^{N} [p_n^{(k)}(t)]^{\beta \tau_n^{(d)}}}.$$

Here, if, the above-described joint probability, that is, logarithm of the following Expression 156 is taken, this leads to the following Expression 157.

[Expression 156]

$$P(\{\vec{p}^{(k)}\},\{\vec{z}^{(d)}\},\{\vec{\tau}^{(d)}\}) = \prod_{k=1}^{K}\left\{\left(\frac{\pi^{\sum_{d=1}^{D}z_{dk}}}{Z_k}\right)\prod_{n=1}^{N}[p_n^{(k)}(t)]^{\beta\sum_{d=1}^{D}z_{dt}\tau_n^{(d)}+\alpha I_n^{(k)}(t-1)+l-1}\right\} \quad (6.3)$$

[Expression 157]

$$\ln P(\{\vec{p}^{(k)}\},\{\vec{z}^{(d)}\},\{\vec{\tau}^{(d)}\})=\Sigma_{k=1}^{K}\Sigma_{d=1}^{D}z_{dk}\ln\pi_k+\Sigma_{k=1}^{K}\Sigma_{d=1}^{D}[\beta\Sigma_{d=1}^{D}z_{dk}\tau_n^{(d)}+\alpha I_n^{(k)}(t-1)]\ln p_n^{(k)}(t). \quad (6.4)$$

The expected value Q is defined as follows using the logarithm of the joint probability.

[Expression 158]

$$Q \equiv E\left[\ln P(\{\vec{p}^{(k)}\},\{\vec{z}^{(d)}\},\{\vec{\tau}^{(d)}\})\right]_{P(\{\vec{z}^{(d)}\}|\{\vec{\tau}^{(d)}\})} = \sum_{k=1}^{K}\sum_{d=1}^{D}\gamma_{dk}\ln\pi_k + \sum_{k=1}^{K}\sum_{n=1}^{N}\left[\beta\sum_{d=1}^{D}\gamma_{dk}\tau_n^{(d)}+\alpha I_n^{(k)}(t-1)\right]\ln p_n^{(k)}(t) \quad (6.5)$$

In addition, in order to obtain this Equation, the following relationship is used.

[Expression 159]

$$E[z_{dk}]_{P(\{\vec{z}^{(d)}\}|\{\vec{\tau}^{(d)}\})} = \sum_{\{\vec{z}^{(d)}\}} z_{dk}\frac{P(\{\vec{z}^{(d)}\}|\{\vec{\tau}^{(d)}\})}{\prod_{d'=1}^{D}P(\vec{z}_{d'k}|\vec{\tau}^{(d')})} = \sum_{z_{dk}=1,0} z_{dk}P(z_{dk}|\vec{\tau}^{(d)}) = P(z_{dk}=1|\vec{\tau}^{(d)}) = \gamma_{dk}. \quad (6.6)$$

Here, under the restriction of the following Expression 160, the expected value Q is maximized with respect to the following Expression 161, which leads to the following relational expression of Expression 162.

$$\Sigma_{n=1}^{N}p_n^{(k)}(t)=1 \quad \text{[Expression 160]}$$

$$p_n^{(k)}(t) \quad \text{[Expression 161]}$$

[Expression 162]

$$p_n^{(k)}(t) = \frac{\beta\sum_{d=1}^{D}\gamma_{dk}\tau_n^{(d)}+\alpha I_n^{(k)}(t-1)}{\beta D_k+\alpha} = \frac{\alpha}{\alpha+\beta D_k}I_n^{(k)}(t-1)+\frac{\beta\sum_{d=1}^{D}\gamma_{dk}\tau_n^{(d)}}{\alpha+\beta D_k} \quad (6.7)$$

Here, the following Expression is given.

[Expression 163]

$$D_k=\Sigma_{d=1}^{D}\gamma_{dk}. \quad (6.8)$$

The relational expression is derived as follows.

[Expression 164]

$$\tilde{Q} \equiv Q + \lambda\left(1-\sum_{n=1}^{N}p_n^{(k)}(t)\right).$$

$$\frac{\partial\tilde{Q}}{\partial p_n^{(k)}(t)} = 0:$$

$$\left[\beta\sum_{d=1}^{D}\gamma_{dk}\tau_n^{(d)}+\alpha I_n^{(k)}(t-1)\right]\frac{1}{p_n^{(k)}(t)}-\lambda = 0.$$

$$\beta\sum_{d=1}^{D}\gamma_{dk}\tau_n^{(d)}+\alpha I_n^{(k)}(t-1) = \lambda p_u^{(k)}(t).$$

$$\sum_{n=1}^{N}: \beta D_k + \alpha = \lambda.$$

$$p_n^{(k)}(t) = \frac{\beta\sum_{d=1}^{D}\gamma_{dk}\tau_n^{(d)}+\alpha I_n^{(k)}(t-1)}{\beta D_k+\alpha} = \frac{\alpha}{\alpha+\beta D_k}I_n^{(k)}(t-1)+\frac{\beta\sum_{d=1}^{D}\gamma_{dk}\tau_n^{(d)}}{\alpha+\beta D_k}.$$

In addition, under the restriction of the following Expression 165, the expected value Q is maximized with respect to the following Expression 166, which leads to the following relational expression of Expression 167.

$$\Sigma_{k=1}^{K}\pi_k=1 \quad \text{[Expression 165]}$$

$$\pi_k \quad \text{[Expression 166]}$$

[Expression 167]

$$\pi_k = \frac{D_k}{D}. \quad (6.9)$$

In a case where the number D of learning data items is sufficiently greater than the number N of nodes of the network, the expected value Q of Equation (6.5) can be approximated as follows.

[Equation 168]

$$Q \equiv E\left[\ln P(\{\vec{\tau}^{(d)}\},\{\vec{z}^{(d)}\},\{\vec{p}^{(k)}\})\right]_{P(\{\vec{z}^{(d)}\}|\{\vec{\tau}^{(d)}\})} = \sum_{k=1}^{K}\sum_{d=1}^{N}Dp_d^{(PR)}\gamma_{dk}\ln\pi_k + \sum_{k=1}^{K}\sum_{n=1}^{N}\left[\beta\sum_{d=1}^{N}Dp_d^{(PR)}\gamma_{dk}\tau_n^{(d)}+\alpha I_n^{(k)}(t-1)\right]\ln p_n^{(k)}(t). \quad (6.10)$$

Here, under the restriction of the following Expression 169, the approximate expected value Q is maximized with respect to the following Expression 170, which leads to the following relational expression of Expression 171.

$$\Sigma_{n=1}^{N}p_n^{(k)}(t)=1 \quad \text{[Expression 169]}$$

$p_n^{(k)}(t)$ [Expression 170]

[Expression 171]

$$p_n^{(k)}(t) = \frac{\alpha}{\alpha + \beta D \sum_{d=1}^{N} p_d^{(PR)} \gamma_{dk}} I_n^{(k)}(t-1) + \frac{\beta D \sum_{d=1}^{N} p_d^{(PR)} \gamma_{dk} \tau_n^{(d)}}{\alpha + \beta D \sum_{d=1}^{N} p_d^{(PR)} \gamma_{dk}}. \quad (6.11)$$

In addition, under the restriction of the following Expression 172, the expected value Q is maximized with respect to the following Expression 173, which leads to the following relational expression of Expression 174.

$\sum_{k=1}^{K} \pi_k = 1$ [Expression 172]

$\pi_k$ [Expression 173]

[Expression 174]

$$\pi_k = \frac{D \sum_{d=1}^{N} p_d^{(PR)} \gamma_{dk}}{D} = \sum_{d=1}^{N} p_d^{(PR)} \gamma_{dk}. \quad (6.12)$$

To summarize, in the example of using the Dirichlet prior distribution, the Markov chains regarding the learning data d are expressed by the following Equation (I) (the same as the above Equations (6.7) and (6.8)).

[Expression 175]

$$p_n^{(k)}(t) = \frac{\beta \sum_{d=1}^{D} \gamma_{dk} \tau_n^{(d)} + \alpha I_n^{(k)}(t-1)}{\beta D_k + \alpha} = \frac{\alpha}{\alpha + \beta D_k} I_n^{(k)}(t-1) + \frac{\beta \sum_{d=1}^{D} \gamma_{dk} \tau_n^{(d)}}{\alpha + \beta D_k} \quad (I)$$

Here, the following Expression 176 is given.

$D_k = \sum_{d=1}^{D} \gamma_{dk}$ [Expression 176]

Procedures of the clustering process in a case of using the Dirichlet prior distribution may be the same as the procedures in a case of using the Gaussian prior distribution exemplified in FIG. 4.

That is to say, in these procedures, as shown in step S50 of FIG. 4, values of the variables included in the respective terms of the right side of Equation (I) are temporarily determined. In addition, the transition probability matrix T is assumed to be obtained in advance based on a link structure or the like of the network, for example, in the same method as in the case of the PageRank algorithm. Further, α and β are parameters of the Dirichlet distribution shown in Equation (6.1) and the like, and these values are designated by a user.

Depending on the temporarily determined following Expression 177, the following Expression 178 of the right side of Equation (I) is set (refer to Equations (4.4a) and (4.4b)).

$\vec{p}^{(k)}(t-1)$ [Expression 177]

$\vec{T}^{(k)}(t-1)$ [Expression 178]

After the variables are temporarily determined as such (S50), the following Expression 179 is calculated using Equation (I) (S52).

$\vec{p}^{(k)}(t)$ [Expression 179]

Next, the attribution degree $\gamma_{dk}$ is calculated using the following Equation (II) (refer to the above Equation (6.2)) (S54).

[Expression 180]

$$\gamma_{dk} = \frac{\pi_k \prod_{n=1}^{N} [p_n^{(k)}(t)]^{\beta \tau_n^{(d)}}}{\sum_{k=1}^{K} \pi_k \prod_{n=1}^{N} [p_n^{(k)}(t)]^{\beta \tau_n^{(d)}}}. \quad (II)$$

Next, $\pi_k^{new}$ is calculated using the following Equation (III) (S56).

[Expression 181]

$$\pi_k^{new} = \frac{D_k}{D} \quad (III)$$

In addition, in a case where the number D of learning data items is sufficiently greater than the number N of nodes of the network, Equations (6.11) and (6.12) may be used instead of Equations (I) and (III).

The other process steps may be the same as those of the Gaussian prior distribution.

In the example of using the Dirichlet prior distribution as well, Equation (I) when the iterative processes of FIG. 4 finish indicates partial Markov chains of the cluster k. As such, in the procedures shown in FIG. 4, Equations (I) to (III) are iteratively calculated while the time step progresses by one step, thus the parameters $D_k$ and $\gamma_{dk}$ in Equation (I) are adjusted, and thereby a form of each cluster k is defined.

As above, some examples regarding a method of learning about clustering the Markov chains have been described. If the Markov chains are clustered, this means that nodes can also be clustered. In other words, a steady state of each cluster k (partial Markov chains) is obtained using a clustering result of the Markov chains, and a probability that an agent may be present on each node n in the steady state is obtained as an attribution degree of the node n to the cluster k, thereby clustering the nodes. More specifically, for example, node groups on a network may be clustered using a clustering result of the Markov chains according to this method, that is, Equation (I) at the point when the iterative processes of FIG. 4 finishes.

Clustering of node groups in this case may be performed through the same process as in clustering (that is, a method of obtaining a steady state through an iterative calculation of Equation (V)) of node groups in the system according to the embodiment.

In other words, even in a case of using either the Gaussian distribution or the Dirichlet distribution as a prior distribution, Equation (I) at the point when the iterative processes of FIG. 4 finish is iteratively calculated with the progress of the time step. When a steady state arrives through this iteration, an active vector (the same as Equation (VI) in the above-described embodiment, that is, an attribution degree vector) of each cluster number k in the steady state is obtained. Each component of the active vector, that is, the following Expression indicates an "attribution degree of a node n to the cluster k".

$$p_n^{[s,k]} \qquad \text{[Expression 182]}$$

That is to say, the greater this value, the higher the possibility that the node n may be attributed to the cluster k. As such, the attribution degree vector indicates a distribution of degrees that each node on the network belongs to the cluster k according to the node number n. This is a result of clustering nodes. It can be said that each node n belongs to each cluster k to a degree indicated by a numerical value of 0 or more and 1 or less which is a component of the node n in each attribution degree vector. In addition, a threshold value for an attribution degree may be set in advance, and it may be determined that a node of which an attribution degree for each cluster k is equal to or more than the threshold value is a node belonging to the cluster k. In this case, the same node n may belong to plural different clusters k.

In addition, in the above description, as learning data for learning about clustering Markov chains, various examples such as a seed vector obtained from search history of a user, a link state of each node on a network, and an observation result (refer to Expression 98) of a node on which a random walker is present, and, the following other learning data items may be used.

$$\vec{\tau}^{(m)}(T_{1m}, T_{2m}, \ldots, T_{mn})(m=1, \ldots, N) \qquad \text{[Expression 183])}$$

$$T_{mn} \qquad \text{[Expression 184]}$$

Here, Expression 184 is a component of the transition probability matrix.

$$\vec{\tau}^{(m)} \qquad \text{[Expression 185]}$$

In other words, the m-th learning data Expression 185 is a vector which has a transition probability from a node m to each node n (where n=1, ..., and N) on a network as the n-th component.

$$\vec{\tau}^{(m)} \qquad \text{[Expression 186]}$$

$$Dp_m^{(PR)} \qquad \text{[Expression 187]}$$

Assuming that the number D of learning data items is sufficiently greater than the number N of nodes on the network, it is considered that, among D, Expression 186 appears a number of times corresponding to Expression 187.

$$p_m^{(PR)} \qquad \text{[Expression 188]}$$

$$\vec{p}^{(PR)} \qquad \text{[Expression 189]}$$

Here, Expression 188 is the m-th component in a steady state of the Markov chains (Equations (3.2a) and (3.2b)) Expression 189, calculated independently in advance. At this time, it is not necessary to obtain a sum total of 1 to D as m in Equation (3.2b), and, only a sum total of 1 to N as m may be calculated in consideration of overlapping.

As above, another example of the clustering has been described. The exemplified clustering process is performed by, for example, the clustering processor 16 in the apparatus configuration of FIG. 3. In this case, the clustering processor 16 may perform the above-described process (refer to FIG. 4) by using information of an adjacent matrix $A_{nm}$, stored in the network information storage device 10 and learning data stored in the learning data storage device 14.

In addition, although, in the above description, an example of using the Gaussian distribution and the Dirichlet distribution as a prior distribution has been described, other probability distributions may be used as a prior distribution.

According to "another example of the clustering" described above, a network may be clustered in calculation time when a rate is controlled by (square of the number N of nodes)×(the number K of clusters).

In the clustering methods shown in the above-described embodiment and "another example of the clustering", in relation to an active vector p which has, as a component, a probability that an agent which follows links on a network and transitions from a node to a node may be present on each node of the network at the same time point, the active vector at a certain time point is calculated from the active vector at the previous time point by using the relational expressions (that is, Equations (I) to (III), (IIIa), (IIIb) and (IIIc)) for each cluster indicating stochastic dynamics of the active vector. The relational expressions for each cluster are set to maximize likelihood of an active vector in a case where learning data is obtained as a result of observation (that is, to maximize the joint probability shown in Equation (4.3), (5.3), (6.1), or the like) assuming that an active vector at a certain time point follows a predefined probability distribution (for example, the Gaussian distribution or the Dirichlet distribution) centering on a transition result of an active vector at the previous time point according to a transition probability matrix of Markov chains based on a link structure of the network. In addition, as exemplified in FIGS. 1 and 4, for each cluster, relational expressions regarding the cluster are iteratively calculated with the sequential progress of time so as to sequentially update parameters included in the relational expressions, and a relational expression which includes parameters when the iterative calculations satisfy a certain finish condition (for example, step S20 of FIG. 1 or step S59 of FIG. 4) is determined as an equation expressing the cluster.

The search system exemplified above is realized, for example, by executing a program which indicates the processes of the above-described respective functional modules in a general purpose computer. Here, the computer has a circuit configuration where, for example, a microprocessor such as a CPU as hardware, memories (primary storage) such as a random access memory (RAM) and a read only memory (ROM), an HDD controller controlling an HDD (Hard Disk Drive), a variety of I/O (input and output) interfaces, a network interface performing a control for connection to a network such as a local area network, and the like are connected to each other via, for example, a bus. In addition, a disk drive for reading and/or writing information from and/or on a portable disc recording medium such as a CD or a DVD, for example, via the I/O interface, a memory reader-writer for reading and/or writing information from and/or in a portable nonvolatile recording medium with various specifications such as a flash memory, and the like may be connected to the bus. A program in which process contents of the respective functional modules exemplified above are described is reserved in a fixed storage device such as the hard disk drive via a recording medium such as a CD or a DVD, or a communication unit such as a network, and is installed in the computer. The program stored in the fixed storage device is read to the RAM, and is executed by the microprocessor such as a CPU, thereby realizing the functional module group exemplified above. In addition, a part of or the overall functional module group may be constituted by a hardware circuit such as dedicated LSI (Large Scale Integration), ASIC (Application Specific Integrated Circuit), or FPGA (Field Programmable Gate Array).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to function as:
a learning data acquiring unit that acquires learning data;
a memory unit that performs machine learning using the learning data about cluster division where Markov chains of transition via a link from a node to a node on a network formed from a plurality of nodes and a plurality of links connecting the plurality of nodes to each other are divided into a plurality of clusters each of which is indicated by a biased Markov chain, and calculates a steady state of each biased Markov chain indicating each cluster of the learning result so as to obtain and store attribution degree information indicating an attribution degree of each node on the network to each cluster of the learning result;
a search condition receiving unit that receives a search condition from a user;
a cluster extracting unit that extracts clusters suitable for the search condition on the basis of a node group matching with the search condition received from the user and the attribution degree information;
a partial network cutting unit that cuts a partial network formed by a node group belonging to the clusters extracted by the cluster extracting unit from the network; and
an importance calculating unit that calculates importance of each node on the partial network by executing an operation of a personalized PageRank algorithm having the node group matching with the search condition as a seed vector for the cut partial network, and generates a search result to the user regarding the search condition on the basis of the calculated importance.

2. The non-transitory computer readable medium storing the program according to claim 1,
wherein the learning data is data of a search result regarding each search condition received from the user by the search condition receiving unit in the past for each user,
wherein the memory unit performs machine learning about cluster division for each user using the search result data in the past related to a corresponding user for each user, and obtains and stores the attribution degree information for each user according to the cluster division for each user which is a learning result, and
wherein the cluster extracting unit extracts clusters suitable for the search condition using the attribution degree information corresponding to a user who is an issuing source of the search condition.

3. A search apparatus comprising:
a learning data acquiring unit that acquires learning data;
a memory unit that performs machine learning using the learning data about cluster division where Markov chains of transition via a link from a node to a node on a network formed from a plurality of nodes and a plurality of links connecting the plurality of nodes to each other are divided into a plurality of clusters each of which is indicated by a biased Markov chain, and calculates a steady state of each biased Markov chain indicating each cluster of the learning result so as to obtain and store attribution degree information indicating an attribution degree of each node on the network to each cluster of the learning result;
a search condition receiving unit that receives a search condition from a user;
a cluster extracting unit that extracts clusters suitable for the search condition on the basis of a node group matching with the search condition received from the user and the attribution degree information;
a partial network cutting unit that cuts a partial network formed by a node group belonging to the clusters extracted by the cluster extracting unit from the network; and
an importance calculating unit that calculates importance of each node on the partial network by executing an operation of a personalized PageRank algorithm having the node group matching with the search condition as a seed vector for the cut partial network, and generates a search result to the user regarding the search condition on the basis of the calculated importance.

4. A search method comprising:
acquiring learning data;
performing machine learning using the learning data about cluster division where Markov chains of transition via a link from a node to a node on a network formed from a plurality of nodes and a plurality of links connecting the plurality of nodes to each other are divided into a plurality of clusters each of which is indicated by a biased Markov chain, and calculating a steady state of each biased Markov chain indicating each cluster of the learning result so as to obtain and store attribution degree information indicating an attribution degree of each node on the network to each cluster of the learning result;
receiving a search condition from a user;
extracting clusters suitable for the search condition on the basis of a node group matching with the search condition received from the user and the attribution degree information;
cutting a partial network formed by a node group belonging to the extracted clusters from the network; and
calculating importance of each node on the partial network by executing an operation of a personalized PageRank algorithm having the node group matching with the search condition as a seed vector for the cut partial network, and generating a search result to the user regarding the search condition on the basis of the calculated importance.

5. A non-transitory computer readable medium storing a program causing a computer to function as:
a calculating unit that calculates an active vector at a certain time point from the active vector at the previous time point by using a relational expression for each cluster indicating stochastic dynamics of the active vector, in relation to the active vector which has, as a component, a probability that an agent which follows links on a network and transitions from a node to a node is present on each node of the network at the same time point; and
a specifying unit that sequentially updates parameters included in the relational expression by the calculating unit iteratively calculating the relational expression regarding a cluster with the sequential progress of time for each cluster, and specifies the cluster on the basis of the parameters when calculation of the relational expression by the calculating unit satisfies a finish condition, wherein the relational expression for each cluster is set to maximize likelihood of an active vector in a case where learning data is obtained as a result of observation assuming that the active vector at a certain time point follows a predefined probability distribution centering on a transition result of the active vector at the previous time point according to a transition probability matrix of Markov chains based on a link structure of the network.

6. A clustering device comprising:

a calculating unit that calculates an active vector at a certain time point from the active vector at the previous time point by using a relational expression for each cluster indicating stochastic dynamics of the active vector, in relation to the active vector which has, as a component, a probability that an agent which follows links on a network and transitions from a node to a node is present on each node of the network at the same time point; and a specifying unit that sequentially updates parameters included in the relational expression by the calculating unit iteratively calculating the relational expression regarding a cluster with the sequential progress of time for each cluster, and specifies the cluster on the basis of the parameters when calculation of the relational expression by the calculating unit satisfies a finish condition, wherein the relational expression for each cluster is set to maximize likelihood of an active vector in a case where learning data is obtained as a result of observation assuming that the active vector at a certain time point follows a predefined probability distribution centering on a transition result of the active vector at the previous time point according to a transition probability matrix of Markov chains based on a link structure of the network.

* * * * *